(12) United States Patent
Kurokawa

(10) Patent No.: US 9,944,168 B2
(45) Date of Patent: Apr. 17, 2018

(54) INDUSTRIAL VEHICLE

(71) Applicant: YANMAR CO., LTD., Osaka (JP)

(72) Inventor: Yoshiaki Kurokawa, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/893,259

(22) PCT Filed: Jun. 11, 2014

(86) PCT No.: PCT/JP2014/065472
§ 371 (c)(1),
(2) Date: Nov. 23, 2015

(87) PCT Pub. No.: WO2014/200021
PCT Pub. Date: Dec. 18, 2014

(65) Prior Publication Data
US 2016/0096426 A1     Apr. 7, 2016

(30) Foreign Application Priority Data

Jun. 14, 2013   (JP) ................................. 2013-125804

(51) Int. Cl.
*B60K 13/04*     (2006.01)
*B62D 25/10*     (2006.01)
(Continued)

(52) U.S. Cl.
CPC .............. *B60K 13/04* (2013.01); *B62D 25/10* (2013.01); *B62D 49/00* (2013.01); *F01N 3/021* (2013.01);
(Continued)

(58) Field of Classification Search
CPC ........ B60K 11/06; B60K 11/08; B60K 13/04; B62D 25/10; F01N 2260/02; F01N 2260/022; F01N 2590/08
See application file for complete search history.

(56) References Cited

U.S. PATENT DOCUMENTS 959,571 A     5/1910  Mays
1,081,050 A   12/1913  Kruse
(Continued)

FOREIGN PATENT DOCUMENTS

DE     881611 C     7/1953
EP     2474723 A1   7/2012
(Continued)

*Primary Examiner* — Frank B Vanaman
(74) *Attorney, Agent, or Firm* — Norris McLaughlin & Marcus, P.A.

(57) ABSTRACT

Regarding an industrial vehicle 101 configured to include an engine 1 mounted on a front portion of a travelling machine body 102 and an exhaust gas purification device 2 for purifying exhaust gas of the engine 1, the industrial vehicle 101 is such that the exhaust gas purification device 2 is mounted on an upper portion side of the engine 1, and the engine 1 and the exhaust gas purification device 2 are covered with a hood 114, and a maneuvering seat 117 is arranged on a rear side of the hood 114, and it is an object to suppress heat damage on the exhaust gas purification device 2 itself and the hood 114. Opening holes 160 are formed on right and left bilateral sides of the hood 114, and an introduction fin 166 that tilts in a posture for taking in outside air from an advancing direction is arranged in each opening hole 160.

5 Claims, 21 Drawing Sheets

(51) Int. Cl.
*F01N 3/10* (2006.01)
*F01N 3/021* (2006.01)
*F01N 13/00* (2010.01)
*B62D 49/00* (2006.01)

(52) U.S. Cl.
CPC ......... *F01N 3/106* (2013.01); *F01N 13/0097* (2014.06); *B60Y 2200/221* (2013.01); *F01N 2260/022* (2013.01); *F01N 2340/04* (2013.01); *F01N 2590/08* (2013.01); *Y02T 10/20* (2013.01)

(56) References Cited

U.S. PATENT DOCUMENTS

| | | | | |
|---|---|---|---|---|
| 2,529,994 | A | * | 11/1950 | Brezek ................... B60K 11/08 180/68.1 |
| 4,081,050 | A | * | 3/1978 | Hennessey ............. B60K 11/04 180/233 |
| 4,083,694 | A | * | 4/1978 | Takeda ................... F01N 3/2046 422/198 |
| 5,036,931 | A | * | 8/1991 | Iritani .................... B60K 11/08 180/68.1 |
| 5,678,649 | A | * | 10/1997 | Minoura ................ B60K 11/08 180/68.1 |
| 2002/0017408 | A1 | * | 2/2002 | Oshikawa ............. B60K 11/08 180/69.2 |
| 2003/0057005 | A1 | | 3/2003 | Nagai et al. |
| 2006/0108813 | A1 | * | 5/2006 | Goebert ................. B62D 25/10 293/115 |
| 2011/0272202 | A1 | | 11/2011 | Kawashiri et al. |
| 2012/0125271 | A1 | * | 5/2012 | Bada Ghar Wala .... F01N 3/055 123/41.04 |
| 2014/0020972 | A1 | * | 1/2014 | Masumoto ............. B60K 11/06 180/309 |
| 2014/0290781 | A1 | * | 10/2014 | Ozaki ...................... F16L 3/08 138/106 |

FOREIGN PATENT DOCUMENTS

| | | |
|---|---|---|
| GB | 414595 A | 8/1934 |
| JP | 2003-095145 | 4/2003 |
| JP | 2008-031955 | 2/2008 |
| JP | 2010-030472 | 2/2010 |
| JP | 2010-159027 | 7/2010 |
| JP | 2010-215122 | 9/2010 |
| JP | 2011-021431 | 2/2011 |
| JP | 2011-126488 | 6/2011 |
| WO | WO-2010/079667 | 7/2010 |

* cited by examiner

INDUSTRIAL VEHICLE

TECHNICAL FIELD

The present invention of the instant application relates to an industrial vehicle, such as a tractor, in which an exhaust has purification device is mounted on the side of an upper portion of an engine, and the engine and the exhaust gas purification device are covered with a hood.

BACKGROUND OF THE INVENTION

These days, with the application of high-level emission control regarding diesel engines (hereinafter merely referred to an engine), it has been demanded that an exhaust gas purification device for purifying and treating air pollution substances in exhaust gas is mounted in agricultural work machines or construction work machines in which an engine is mounted. As the exhaust gas purification device, a diesel particulate filter (hereinafter referred to as DPF) for collecting particulate matter and the like in the exhaust gas has been known (for example, see Patent Literature 1).

CITATION LIST

PTL 1: Japanese Unexamined Patent Application Publication No. 2008-31955

SUMMARY OF THE INVENTION

Patent Literature 1 discloses the structure of a tractor in which an engine is mounted in the front portion of a travelling machine body, and a front-to-back longitudinal DPF is arranged on one side of the right and left of an exhaust manifold above the engine and, and the engine along with the DPF is covered with a hood. In the tractor disclosed in Patent Literature 1, the DPF in the hood is further covered with a cover, which is aimed at suppressing an increase in temperature in the hood, but it is likely that heat stagnates and stays in the hood after the stop of the engine. Accordingly, there is a problem in that it is difficult to suppress the occurrence of heat damage on the DPF itself, the hood, and the like.

Accordingly, it is an object of the present invention to provide an industrial vehicle, in which improvements are provided in the light of the current circumstances.

The present invention is such that an industrial vehicle includes an engine mounted on a front portion of a travelling machine body and an exhaust gas purification device for purifying exhaust gas of the engine, and the industrial vehicle is such that the exhaust gas purification device is mounted on an upper portion side of the engine, and the engine and the exhaust gas purification device are covered with a hood, and a maneuvering seat is arranged on a rear side of the hood, and the industrial vehicle includes opening holes configured to be formed on right and left bilateral surfaces of the hood, and an introduction fin that is configured to tilt in a posture for taking in outside air from a front side of the travelling machine body in an advancing direction is arranged in each opening hole.

Regarding the industrial vehicle, the present invention is such that each opening hole is formed on a beveling portion that tilts obliquely downward while advancing from a right-and-left inner side to a right-and-left outer side, out of the right and left bilateral surfaces of the hood, and the exhaust gas purification device faces one of the opening holes when viewed from a lateral surface, and the exhaust gas purification device is configured not to protrude from one of the opening holes.

Regarding the industrial vehicle, the present invention is such that a transfer direction of the exhaust gas in the exhaust gas purification device and a direction of an output shaft of the engine are set in parallel, and the transfer direction of the exhaust gas in the exhaust gas purification device is along a back-and-forth direction of the hood, and the exhaust gas purification device is arranged on one of right and left sides near to an exhaust manifold above the engine.

According to the present invention of the instant application, an industrial vehicle includes the engine mounted on a front portion of the travelling machine body and the exhaust gas purification device for purifying the exhaust gas of the engine, and the industrial vehicle is such that the exhaust gas purification device is mounted on the upper portion side of the engine, and the engine and the exhaust gas purification device are covered with the hood, and the maneuvering seat is arranged on the rear side of the hood, and the industrial vehicle includes the opening holes configured to be formed on the right and left bilateral sides of the hood, and the introduction fin that is configured to tilt in a posture for taking in the outside air from the front side of the travelling machine body in the advancing direction is arranged in each opening hole, so that the heat generated by the exhaust gas purification device can be dissipated to the outside of the hood by way of each opening hole not only during the drive of the engine but also after the stop of the engine, and the heat can be prevented from stagnating in the interior of the hood. As a result, the occurrence of heat damage on the exhaust gas purification device itself and the hood can be suppressed.

In particular, the introduction fin arranged in each opening hole is tilted in a posture for taking in the air from the front side of the travelling machine body in the advancing direction, so that when the industrial vehicle travels, the outside air is guided and introduced into the hood by means of the introduction fin, and the ambient temperature of the exhaust gas purification device can be prevented from increasing excessively. Also, after the stop of the engine, the discharge direction of the heat in the interior of the hood is directed forward with respect to the maneuvering seat by means of the introduction fin, thereby reducing the possibility of exposing the operator, who takes the maneuvering seat, to the heat.

According to the present invention, each opening hole is formed on the beveling portion that tilts obliquely downward while advancing from the right-and-left inner side to the right-and-left outer side, out of the right and left bilateral surfaces of the hood, and the exhaust gas purification device faces one of the opening holes when viewed from a lateral surface, and the exhaust gas purification device is configured not to protrude from one of the opening holes, so that while the heat generated by the exhaust gas purification device is dissipated to the outside of the hood after the stop of the engine, the scattering objects, for example, rainwater and dust can be prevented from falling on the exhaust gas purification device.

According to the present invention, the transfer direction of the exhaust gas in the exhaust gas purification device and the direction of the output shaft of the engine are set in parallel, and the transfer direction of the exhaust gas in the exhaust gas purification device is along the back-and-forth direction of the hood, and the exhaust gas purification device is arranged on one of the right and left sides near to the exhaust manifold above the engine, so that when the exhaust gas purification device faces one of the opening holes, the transfer direction of the exhaust gas in the exhaust gas purification device, that is, the longitudinal direction of the exhaust gas purification device is along the back-and-forth direction of the hood, and the wide range of the outer circumferential surface of the exhaust gas purification device can face one of the opening holes. Accordingly, the heat generated by the exhaust gas purification device can be smoothly dissipated to the outside of the hood by way of one of the opening holes. 2

DESCRIPTION OF THE PREFERRED EMBODIMENTS

Figure 1:
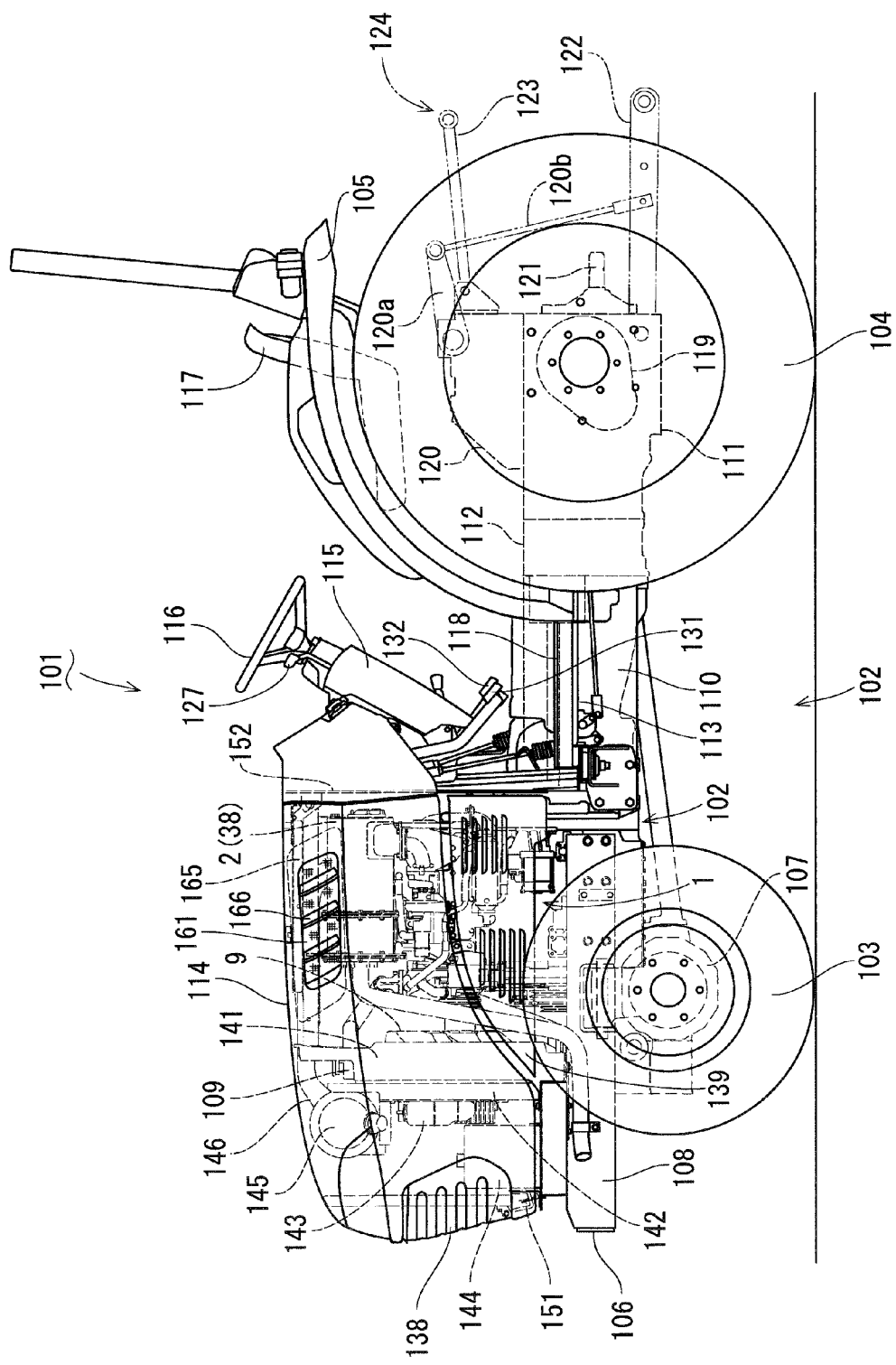
FIG. 1 is a left side view of a tractor in which an engine of an embodiment is mounted.

Hereinafter, an embodiment, in which the present invention is embodied, will be described based on drawings. First, the structure in which an engine 1 is mounted on a tractor 101 as an industrial vehicle will be described referring to FIGS. 1 and 2. In the tractor 101 of the embodiment, a travelling machine body 102 is supported with front wheels 103 and rear wheels 104 arranged in the front and rear on the bilateral sides of the right and left thereof. The engine 1 is mounted as a power engine in the front portion of the travelling machine body 102. It is configured such that the power from the engine 1 causes the right and left rear wheels 104 and the right and left front wheels 103 to rotate, thereby moving the travelling machine body 102 forward and backward. The right and left front wheels 103 and the right and left rear wheels 104 constitute the travelling portion of the tractor 101.

The travelling machine body 102 includes an engine frame 108 that includes a front bumper 106 and a front axle case 107, a clutch housing 110 in which a main clutch for engaging/disengaging the transmission of the power from the engine 1 is incorporated, a transmission case 111 for appropriately shifting the power of engine 1 and transmitting the power to the right and left rear wheels 104 and the right and left front wheels 103, a transmission front surface case 112 that connects the transmission case 111 to the clutch housing 110, and a pair of right and left step frames 113 that is directed outward and installed in a protruding manner on the outer side surface of the clutch housing 110.

A radiator 109 for a coolant is arranged in the front of the engine 1. The rear end side of the engine frame 108 is coupled to the outer side surface of the right and left (specifically, engine leg mounting units 24 provided on an oil pan 12) of the engine 1. The front surface side of the clutch housing 110 is coupled to the rear surface side of a flywheel housing 10 of the engine 1. The front surface side of the transmission case 111 is coupled to the rear surface side of the clutch housing 110 via the transmission front surface case 112.

A maneuvering seat 117 on which an operator sits and a maneuvering column 115 positioned in front of the maneuvering seat 117 are provided on the upper surface side of the travelling machine body 102. A steering wheel 116 is provided on the upper portion side of the maneuvering column 115. It is configured such that the operator who takes the maneuvering seat 117 manipulates and rotates the steering wheel, and the steering angle (steering angle) of the right and left front wheels 103 is changed in accordance with the rotational manipulated variable.

The engine 1 is covered with a hood 114. The maneuvering column 115 is vertically arranged on the upper surface side of the clutch housing 110. The steering wheel 116 for changing the steering angle (steering angle) of the right and left front wheels 103 through manipulation is provided on the upper surface side of the maneuvering column 115. The maneuvering seat 117 on which the operator sits is arranged on the upper surface side of the transmission case 111. A flat floor plate 118 is provided on the upper surface side of the right and left step frames 113. The right and left front wheels 103 are mounted on the engine frame 108 via the front axle case 107. The right and left rear wheels 104 are rotatably mounted on the right and left tip end sides of a rear axle case 119 that protrudes outward from the outer side surface of the transmission case 111. The upper surface sides of the right and left rear wheels 104 are covered with rear fenders 105.

A hydraulic hoisting and lowering mechanism 120 for hoisting and lowering a work portion (not illustrated) of a rotary cultivator coupled to the rear portion of the travelling machine body 102 is detachably mounted on the upper surface of the rear portion of the transmission case 111. A PTO shaft 121 for transmitting a PTO drive three to the work portion is installed in a protruding manner on the rear surface of the transmission case 111. It is noted that the work portion is coupled to the rear portion of the transmission case 111 via a three-point linkage mechanism 124 made up of a pair of right and left lower links 122 and one top link 123. The right and left lift arms 120*a* of the hydraulic hoisting and lowering mechanism 120 are coupled to the right and left lower links 122 via a lift rod 120*b*. The work portion is hoisted and lowered via the three-point linkage mechanism 124 by rotating upward and downward the lift arms 120*a* of the hydraulic hoisting and lowering mechanism 120.

A static hydraulic continuously variable transmission 125 (HST) is provided on the front surface side of the transmission front surface case 112. The static hydraulic continuously variable transmission 125 of the embodiment is incorporated in the rear portion of the clutch housing 110. Although details are omitted, the rotational power of the engine 1 is transmitted to the static hydraulic continuously variable transmission 125 by way of a main drive axle coupled to a flywheel 11 via the main clutch. Subsequently, the output from the static hydraulic continuously variable transmission 125 is appropriately shifted by an auxiliary transmission gear mechanism, and the shifted output is transmitted to the right and left rear wheels 104 by way of a differential gear mechanism for rear wheels. The the shifted output that is appropriately shifted by the auxiliary transmission gear mechanism can be transmitted to the right and left front wheels 103 via a two-wheel-drive-and-four-wheel-drive switching mechanism and the differential gear mechanism in the front axle case 107. In contrast, the rotational power by way of the main drive axle is transmitted to a PTO decelerating mechanism via a PTO transmission shaft, then appropriately decelerated by the PTO decelerating mechanism, and transmitted to the PTO shaft 121 via the PTO clutch.

Figure 2:
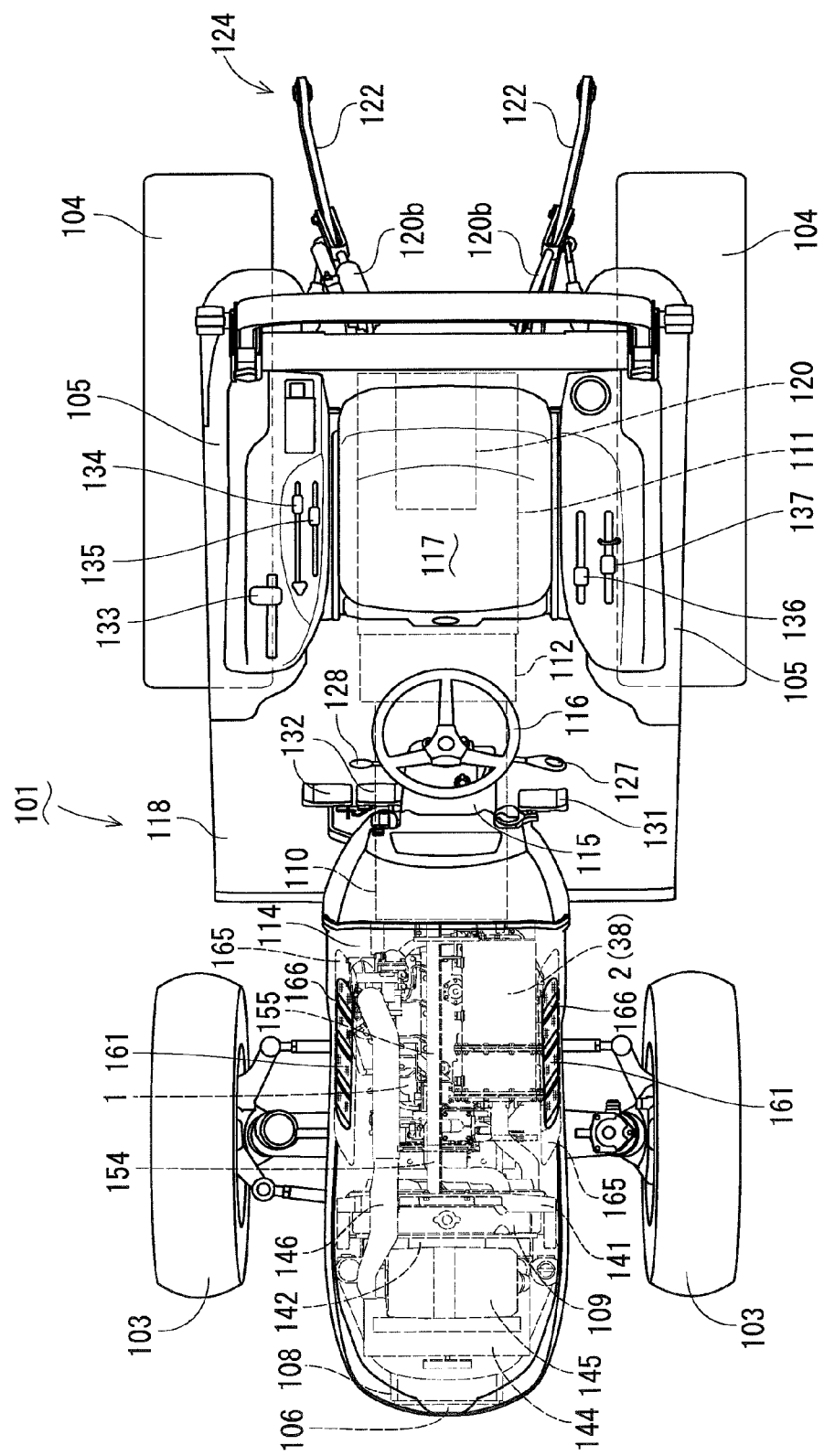
FIG. 2 is a plan view of the tractor.
Figure 3:
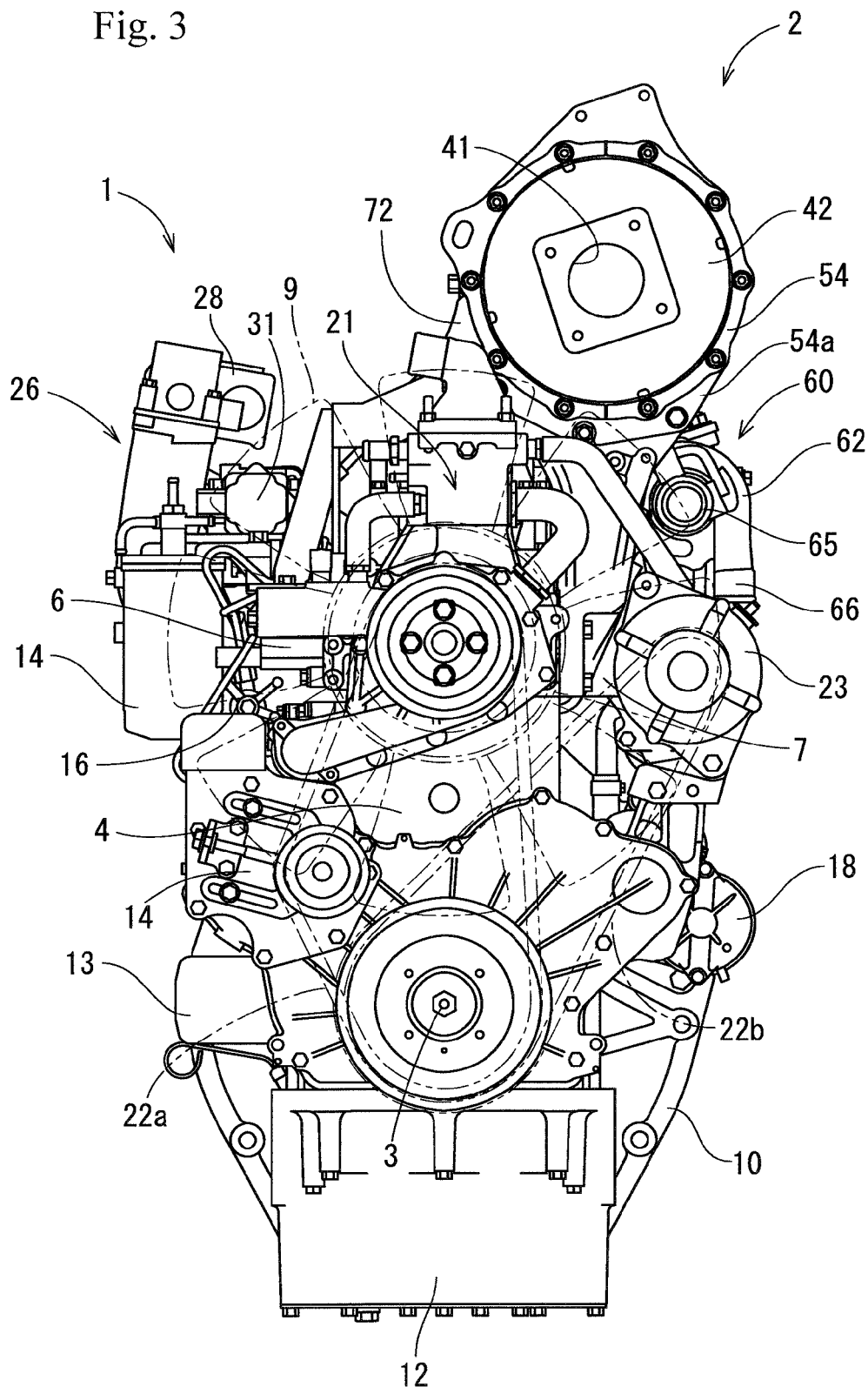
FIG. 3 is a front view of the engine of the embodiment.
Figure 4:
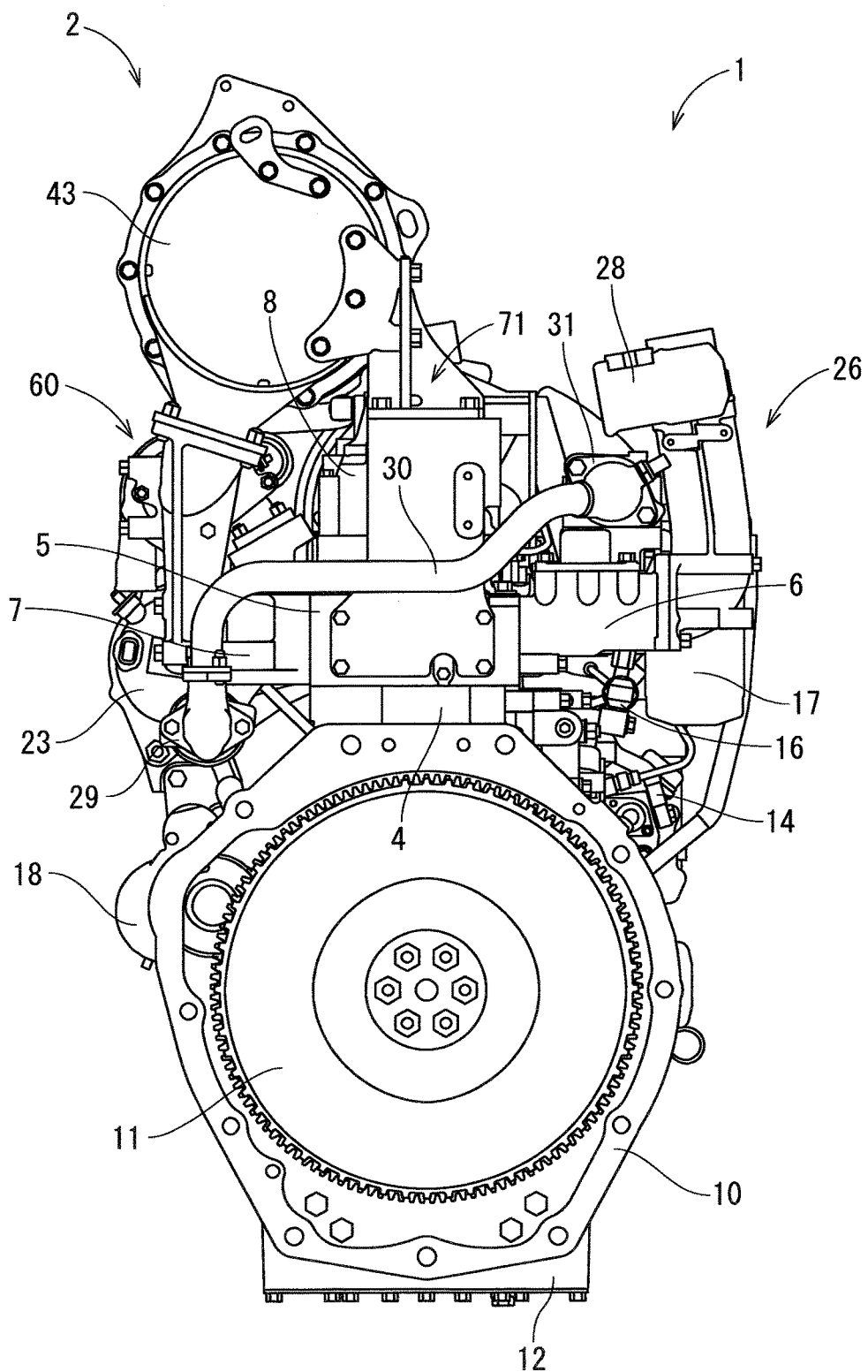
FIG. 4 is a rear view of the engine.
Figure 5:
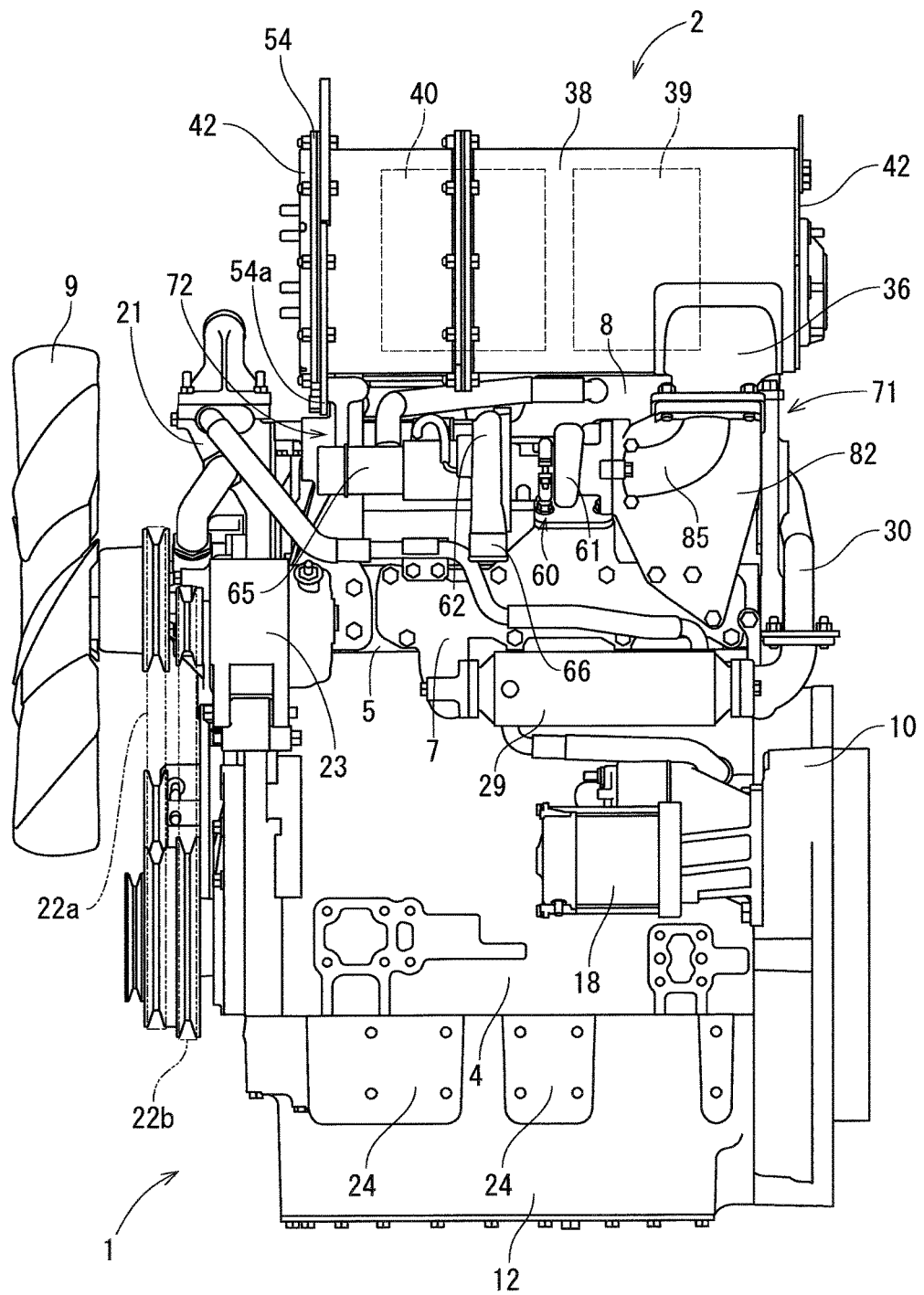
FIG. 5 is a left side view of the engine.

As illustrated in FIGS. 1 and 2, a clutch pedal 131 is arranged to the left of the maneuvering column 115. An operator depresses the clutch pedal 131 with his foot, which actuates the main clutch in the clutch housing 110, and the transmission of the power from the engine 1 is blocked. A right-and-left brake pedal 132 for actuating respective brake mechanisms (not illustrated) for the control of the right and left rear wheels 104 is arranged to the right of the maneuvering column 115. The brake mechanism is actuated by the operation of depressing the brake pedal 132, and the right and left rear wheels 104 are damped. It is noted that a reverse lever 127 for switching a transfer direction to the forward or backward direction is arranged below the steering wheel 116 and on the left of the maneuvering column 115. An accelerator lever 123 for changing the number of revolutions of the engine 1 is arranged below the steering wheel 116 and on the right of the maneuvering column 115.

As illustrated in FIG. 2, a main gear shift lever 133 for shifting the static hydraulic continuously variable transmission 125 through manipulation is arranged on the right of the maneuvering seat 117. A work-portion hoisting-and-lowering lever 134 and a tilling-depth adjusting lever 135 are also arranged on the right of the maneuvering seat 117. The lift arms 120*a* of the hydraulic hoisting and lowering mechanism 120 are rotated up and down by the manual operation of the work-portion hoisting-and-lowering lever 134 or the tilling-depth adjusting lever 135. An auxiliary gear shift lever 136 for switching the auxiliary transmission mechanism through manipulation is arranged on the left of the maneuvering seat 117. Each shift gear of the auxiliary transmission mechanism is selectively switched in three stages inclusive of a low speed position, a medium speed position, and a high speed position by the manual operation of the auxiliary gear shift lever 136. Neutral positions where auxiliary transmission output reaches zero are provided between the low speed position and the medium speed position, and between the medium speed position and the high speed position. Also, a PTO lever 137 for engaging/disengaging the transmission of the power to the PTO shaft 121 is arranged on the left of the maneuvering seat 117.

Subsequently, the schematic structure of the common-rail engine 1 of the embodiment will be described referring to FIGS. 3 to 7. It is noted that, in the description below, the bilateral side portions (bilateral side portions sandwich an output shaft 3) along the output shaft 3 are referred to as "right-and-left", and the arrangement side of a cooling fan 9 is referred to as "front side", and the arrangement side of the flywheel 11 is referred to as "rear side", and the arrangement side of an exhaust manifold 7 is referred to as "left side", and the arrangement side of an intake manifold 6 is referred to as "right side", which serves as references for the four directions and the up-and-down positional relation regarding the engine 1 for convenience' sake.

As illustrated in FIGS. 3 to 7, the engine 1 mounted on the industrial vehicle such as the tractor, as a power engine, includes a continuously regenerating exhaust gas purification device 2 (DPF). The particulate matter (PM) in the exhaust gas emitted from the engine 1 is removed by the exhaust gas purification device 2, and carbon monoxide (CO) or hydrogen carbon (HC) in the exhaust gas is reduced.

The engine 1 includes a cylinder block 4 in which the output shaft 3 (crankshaft) and pistons (not illustrated) are incorporated. A cylinder head 5 is mounted on the cylinder block 4. The intake manifold 6 is arranged on the right lateral surface of the cylinder head 5. The exhaust manifold 7 is arranged on the left lateral surface of the cylinder head 5. That is, the intake manifold 6 and the exhaust manifold 7 are allocated and arranged on the bilateral surfaces along the output shaft 3 in the engine 1. Ahead cover 8 is arranged on the upper surface of the cylinder head 5. The cooling fan 9 is provided on one side surface intersecting with the output shaft 3 in the engine 1, specifically, the front surface of the cylinder block 4. The rotational power is transmitted from the front end side of the output shaft 3 to the cooling fan 9 via a V belt 22*a* for the cooling fan.

The flywheel housing 10 is provided on the rear surface of the cylinder block 4. The flywheel 11 is arranged in the flywheel housing 10. The flywheel 11 is pivotally supported on the rear end side of the output shaft 3. It is configured such that the power of the engine 1 is taken out to the work portion of the industrial vehicle via the output shaft 3. Also, an oil pan 12 is arranged on the lower surface of the cylinder block 4. Lubricating oil in the oil pan 12 is supplied to each lubricating portion of the engine 1 via an oil filter 13 arranged on the right lateral surface of the cylinder block 4.

A fuel supply pump 14 for supplying fuel is mounted above the oil filter 13 (below the intake manifold 6) on the right lateral surface of the cylinder block 4. Injectors 15 for three cylinders, each of which includes a fuel injection valve (not illustrated) of an electromagnetic opening/closing control type, are provided in the engine 1. Each injector 15 is connected to a fuel tank (not illustrated) mounted on the industrial vehicle via the fuel supply pump 14, a cylindrical common rail 16, and a fuel filter 17.

The fuel in the fuel tank is pressure-fed from the fuel supply pump 14 to the common rail 16 via the fuel filter 17, and high-pressure fuel is accumulated in the common rail 16. The fuel injection valve of each injector 15 is controlled in such a manner as to be opened and closed, and the high-pressure fuel in the common rail 16 is injected from each injector 15 to each cylinder of the engine 1. It is noted that a starter 18 for starting the engine is provided in the flywheel housing 10. The pinion gear of the starter 18 for starting the engine is meshed with a ring gear of the flywheel 11. When the engine 1 is started, the ring gear of the flywheel 11 is rotated by the rotational force of the starter 18, which causes the output shaft 3 to start rotating (what is called cranking is executed).

A coolant pump 21 is arranged coaxially with the fan shaft of the cooling fan 9 on the front surface side (the side of the cooling fan 9) of the cylinder head 5. As a generator, an alternator 23 that generates electricity by use of the power of the engine 1 is provided on the left side of the engine 1, specifically, on the left side of the coolant pump 21. The rotational power is transmitted from the front end side of the output shaft 3 to the cooling fan 9 and the coolant pump 21 via the V belt 22a for the cooling fan. Also, the rotational power is transmitted from the front end side of the output shaft 3 to the alternator 23 via a V belt 22b for the alternator. The coolant in the radiator mounted on the industrial vehicle is supplied to the cylinder block 4 and the cylinder head 5 by means of the drive of the coolant pump 21, thereby cooling the engine 1.

Engine leg mounting units 24 are provided on the right and left lateral surfaces of the oil pan 12. In each engine leg mounting unit 24, an engine leg body (not illustrated) that includes a vibration-proof rubber can be fastened with bolts. In the embodiment, the oil pan 12 is clamped with a pair of right and left engine frames of the industrial vehicle, and the engine leg mounting unit 24 on the side of the oil pan 12 is fastened with bolts to each engine frame, so that the both engine frames of the industrial vehicle support the engine 1.

Figure 6:
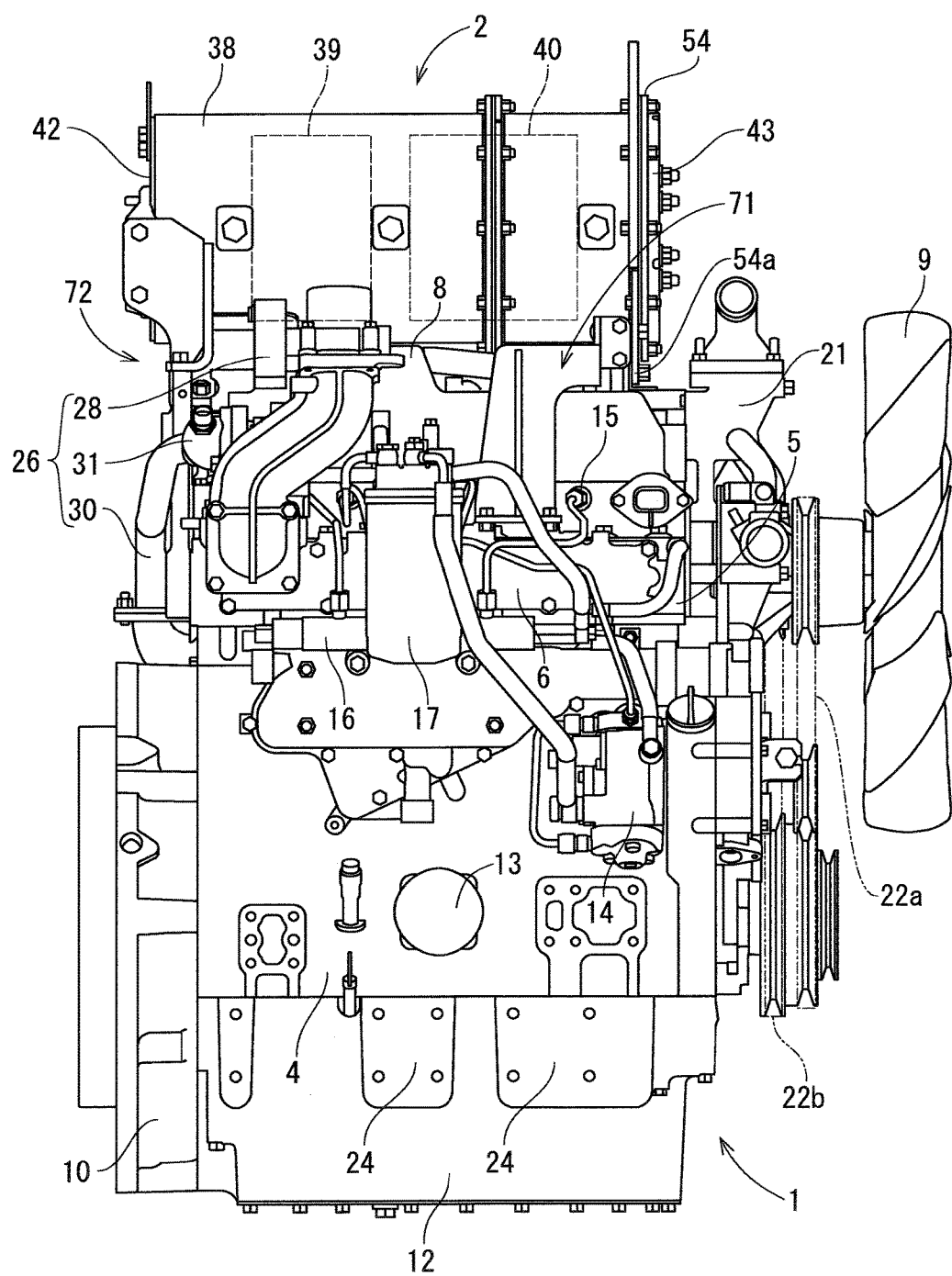
FIG. 6 is a right side view of the engine.
Figure 7:
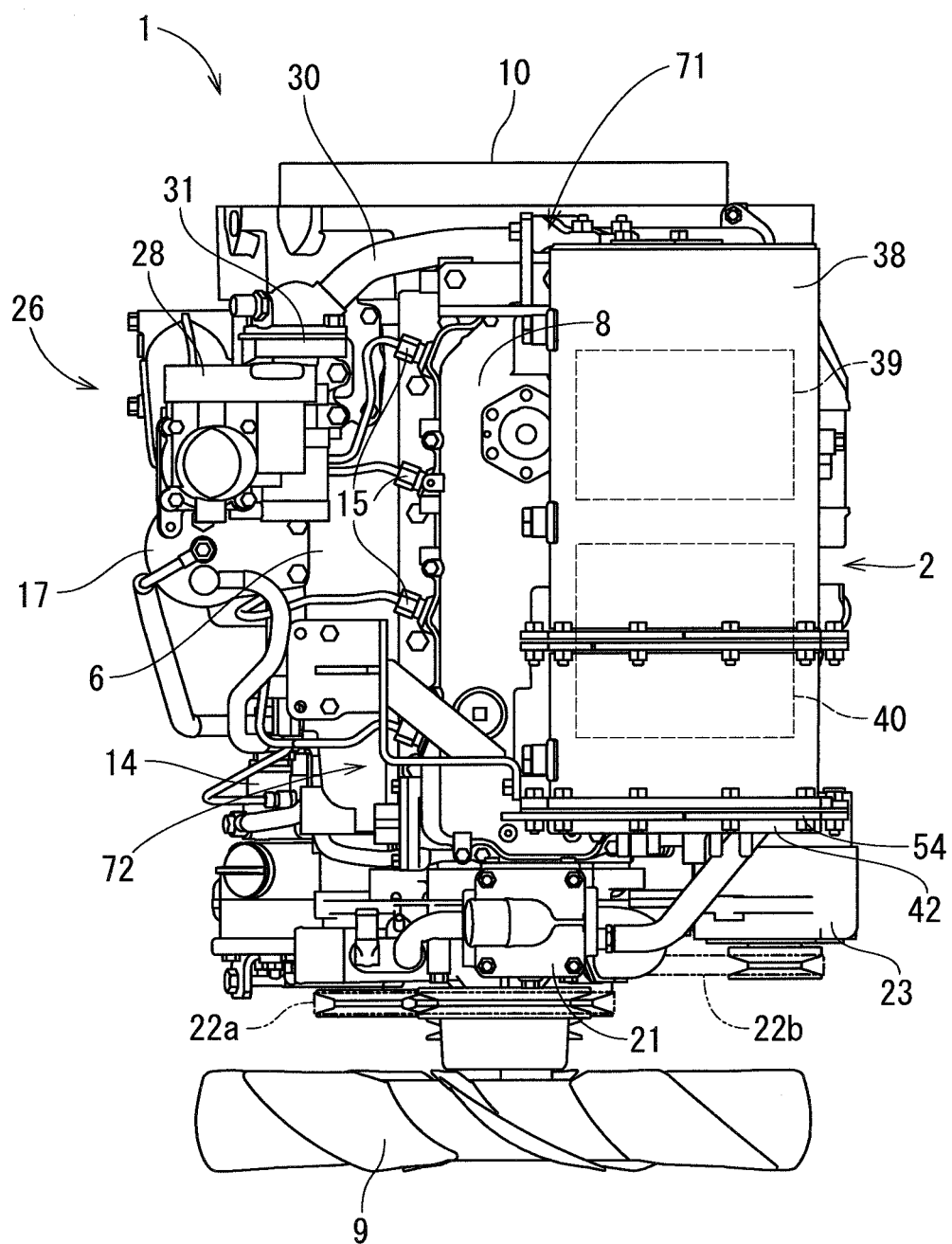
FIG. 7 is a plan view of the engine.
Figure 8:
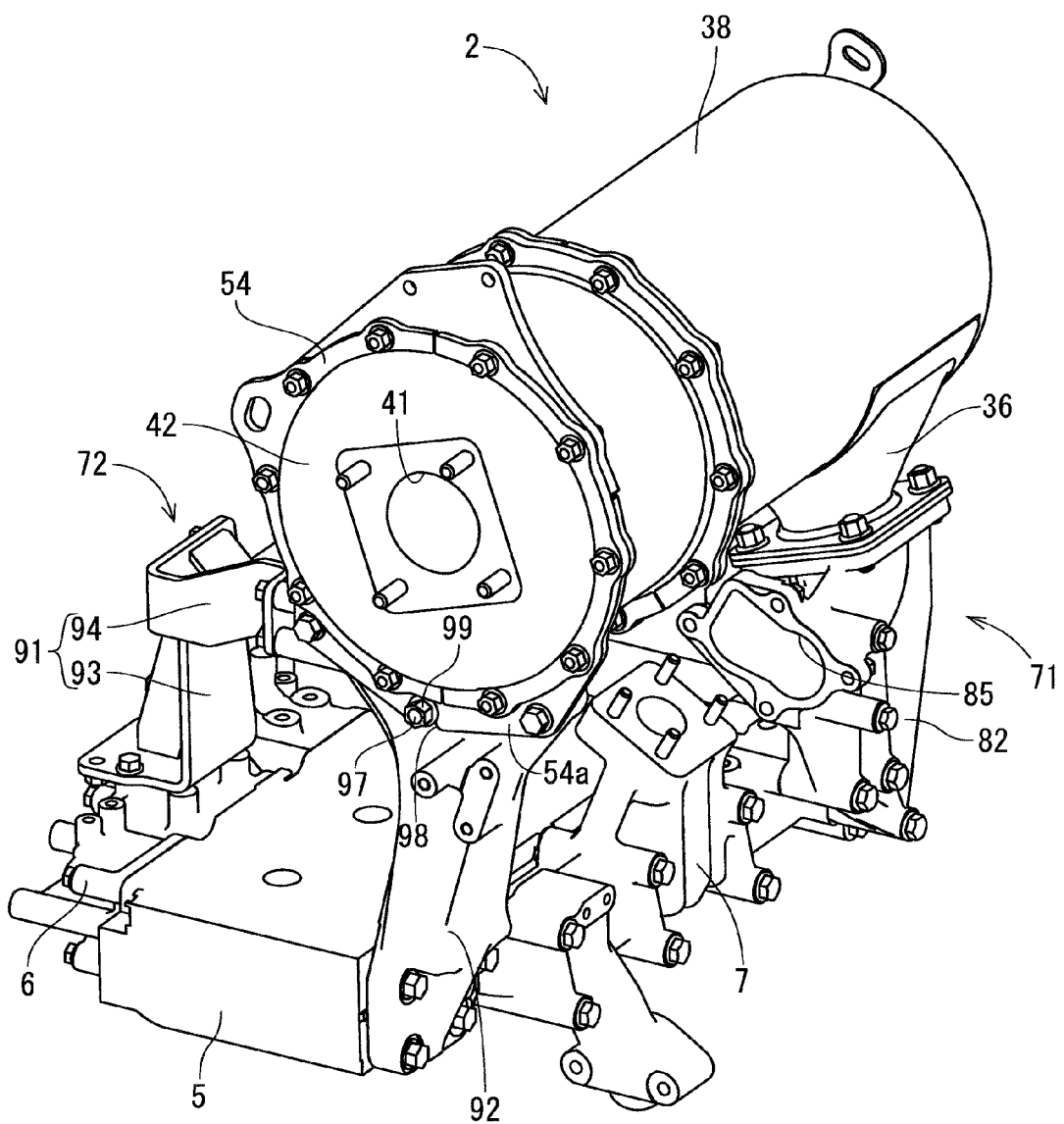
FIG. 8 is a perspective view illustrating a positional relation of a cylinder head and an exhaust gas purification device when viewed from above on an obliquely left-front side.
Figure 9:
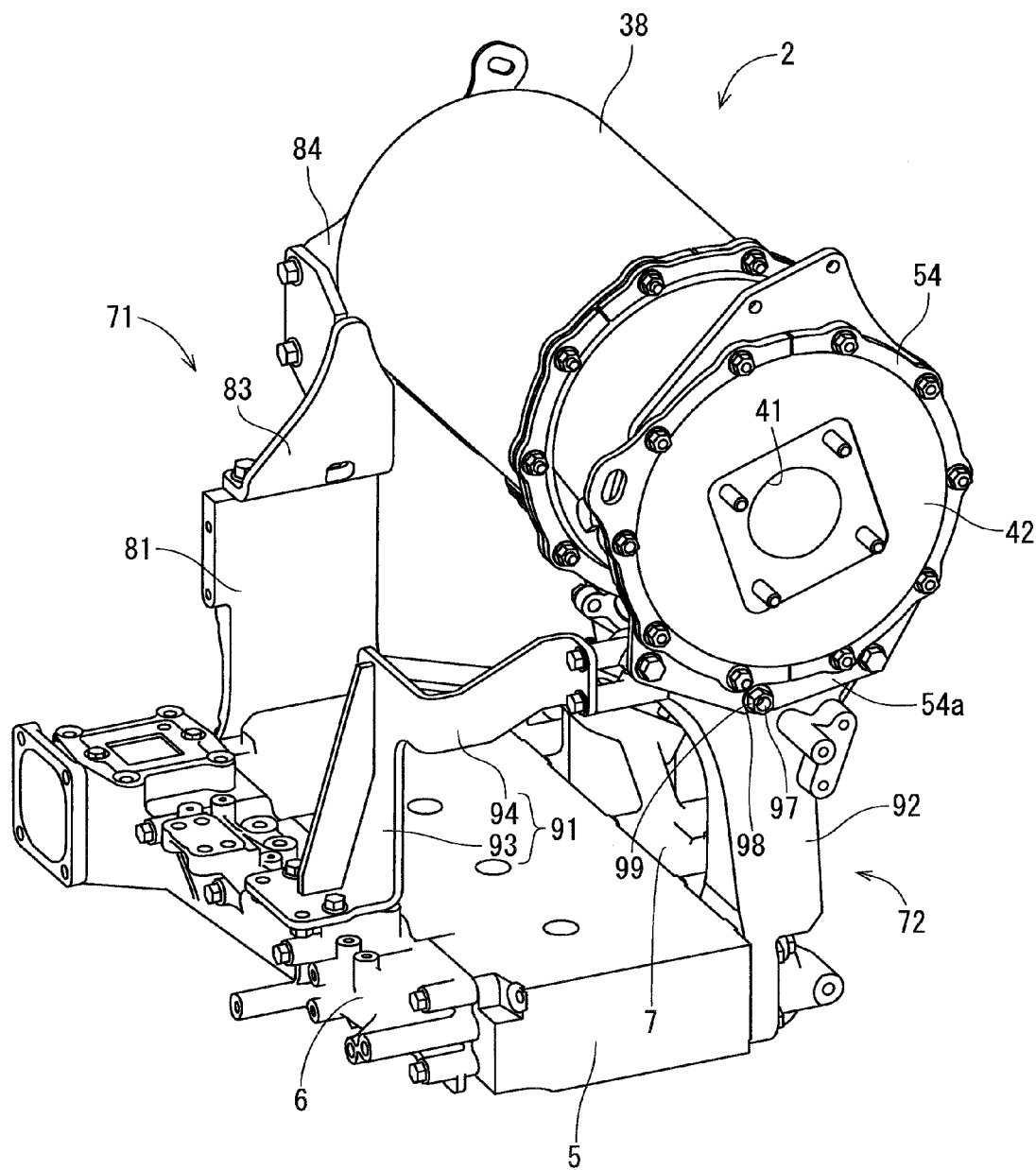
FIG. 9 is a perspective view illustrating a positional relation of the cylinder head and the exhaust gas purification device when viewed from above on an obliquely right-front side.
Figure 10:
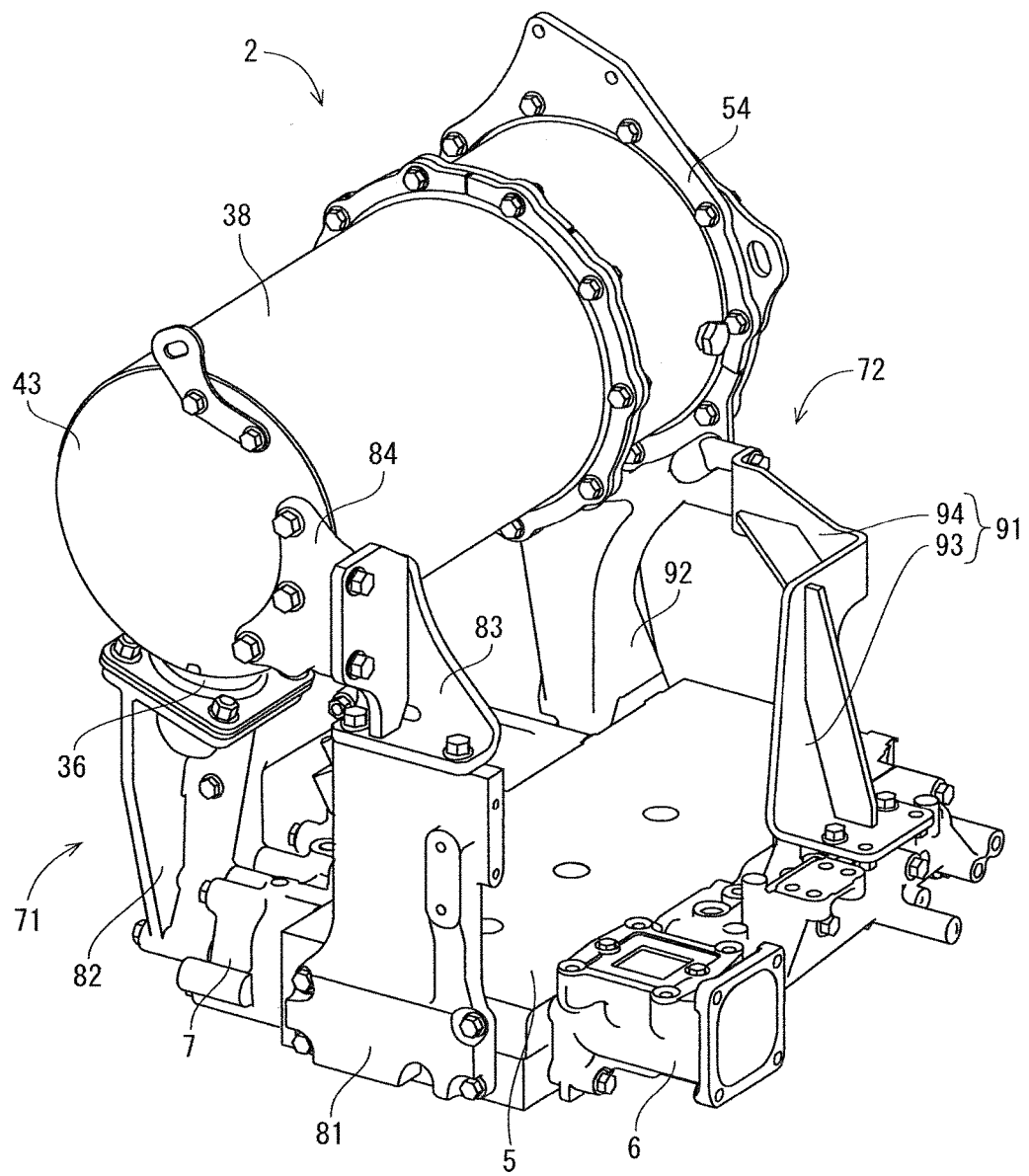
FIG. 10 is a perspective view illustrating a positional relation of the cylinder head and the exhaust gas purification device when viewed from above on an obliquely right-rear side.

As illustrated in FIGS. 6 and 7, an air cleaner is coupled with the inlet portion of the intake manifold 6 via an EGR device 26 (exhaust gas recirculation device). The EGR device 26 is mainly positioned on the right side of the engine 1, specifically, the right side of the cylinder head 5. After fresh air (outside air) drawn in by the air cleaner is purified by removing dust by means of the air cleaner, the fresh air is delivered to the intake manifold 6 via a compressor case 62 (its details are described later) of a turbo supercharger 60 and the EGR device 26 and supplied to each cylinder of the engine 1.

The EGR device 26 includes an EGR main body case that mixes the part of the exhaust gas (EGR gas) of the engine 1 with the fresh air and supplies the mixed air to the intake manifold 6, an intake throttle member 28 through which the EGR main body case communicates with the air cleaner, a recirculation exhaust gas pipe 30 connected to the exhaust manifold 7 via an EGR cooler 29, and an EGR valve member 31 through which the EGR main body case communicates with the recirculation exhaust gas pipe 30. In the embodiment, the air intake side of the intake manifold 6 constitutes the EGR main body case.

That is, the intake throttle member 28 is coupled with the air intake side of the intake manifold 6. Also, the outlet side of the recirculation exhaust gas pipe 30 is connected to the air intake side of the intake manifold 6. The inlet side of the recirculation exhaust gas pipe 30 is connected to the exhaust manifold 7 via the EGR cooler 29. The opening degree of the EGR valve in the EGR valve member 31 is adjusted, thereby adjusting the amount of EGR gas supplied to the air intake side of the intake manifold 6.

With the aforementioned constitution, the fresh air is supplied from the air cleaner into the air intake side of the intake manifold 6 via the intake throttle member 28, whereas the EGR gas is supplied from the exhaust manifold 7 into the air intake side of the intake manifold 6. The fresh air from the air cleaner and the EGR gas from the exhaust manifold 7 are mixed in the air intake side of the intake manifold 6. Part of the exhaust gas discharged from the engine 1 to the exhaust manifold 7 is returned from the intake manifold 6 to the engine 1, so that the maximum combustion temperature during high-load operations is reduced, and the amount of NOx (nitride oxides) discharged from the engine 1 is reduced.

The turbo supercharger 60 is arranged on the left side of the cylinder head 5 and above the exhaust manifold 7. The turbo supercharger 60 includes a turbine case 61 in which a turbine wheel is incorporated, and a compressor case 62 in which a blower wheel is incorporated. The exhaust intake side of the turbine case 61 is coupled with the outlet portion of the exhaust manifold 7. A purification inlet pipe 36 provided on an outer circumferential portion on the exhaust intake side of the exhaust gas purification device 2 is coupled with the exhaust discharge side of the turbine case 61. That is, the exhaust gas discharged from each cylinder of the engine 1 to the exhaust manifold 7 is released to the outside by way of the turbo supercharger 60, the exhaust gas purification device 2, and the like.

The air intake side of the compressor case 62 is connected to the intake-air discharge side of the air cleaner via as feed pipe 65. The intake-air discharge side of the compressor case 62 is connected to the intake manifold 6 is as supercharging pipe 66 and the EGR device 26. That is, the fresh air in which dust is removed by means of the air cleaner is transferred from the compressor case 62 to the EGR device 26 via the supercharging pipe 66, and subsequently supplied to each cylinder of the engine 1.

The exhaust gas purification device 2 is arranged above the exhaust manifold 7 and the turbo supercharger 60 on the upper surface side of the engine 1, that is, above the exhaust manifold 7 and the turbo supercharger 60 on the left side of the cylinder head 5. In this case, the posture of the exhaust gas purification device 2 is set in such a manner that the longitudinal direction of the exhaust gas purification device 2 extends in parallel to the output shaft 3 of the engine 1.

Next, the structure of the exhaust gas purification device 2 will be described referring to FIGS. 3 to 7 described above and FIGS. 8 to 12. The exhaust gas purification device 2 includes a purification housing 38 that includes the purification inlet pipe 36. In the interior of the purification housing 38, a diesel oxidation catalyst 39 such as platinum that generates nitrogen dioxide ($NO_2$), and a soot filter 40 having honeycomb structure, in which the particulate matter (PM) collected is consecutively oxidized and removed at a relatively low temperature, are placed in series in the transfer direction of the exhaust gas. The diesel oxidation catalyst 39 and the soot filter 40 correspond to the exhaust gas purification device stored in the purification housing 38. It is noted that the exhaust gas outlet 41 of the purification housing 38 is coupled, for example, to a silencer or a tail pipe via an exhaust pipe, and the exhaust gas is discharged from the exhaust gas outlet 41 to the outside via the silencer or the tail pipe.

With the aforementioned constitution, the nitrogen dioxide ($NO_2$) generated by the oxidation action of the diesel oxidation catalyst 39 is taken into the soot filter 40. The particulate matter included in the exhaust gas of the engine 1 is collected by the soot filter 40, consecutively oxidized, and removed by the nitrogen dioxide ($NO_2$). In addition to the removal of the particulate matter (PM) included in the exhaust gas of the engine 1, the content of carbon monoxide (CO) or hydrogen carbon (HC) in the exhaust gas of the engine 1 is reduced.

The purification inlet pipe 36 is provided at the outer circumferential portion on the exhaust intake side of the purification housing 38. The exhaust intake side of the purification inlet pipe 36 is communicated with the exhaust discharge side of the turbine case 61. In this case, the lower end side of an inlet-side second bracket 82 constituting a housing support body described later is fastened with bolts to the exhaust manifold 7. An exhaust joint pipe 85 is formed as an exhaust joint path on the upper portion side of the inlet-side second bracket 82. The exhaust intake side of the exhaust joint pipe 85 is opened forward in an up-and-down midway portion of the inlet-side second bracket 82. The exhaust discharge side of the exhaust joint pipe 85 is opened upward on the upper end side of the inlet-side second bracket 82. The exhaust intake side of the exhaust joint pipe 85 in the inlet-side second bracket 82 is fastened with bolts to the exhaust discharge side of the turbine case 61, and the exhaust discharge side of the exhaust joint pipe 85 is fastened to the outlet portion of the exhaust manifold 7. Accordingly, the exhaust manifold 7 and the exhaust gas purification device 2 are communicated through the exhaust joint pipe 85 of the inlet-side second bracket 82.

A lid body 42 is welded and fixed on the end portion on the exhaust downstream side of the purification housing 38. The end portion on the exhaust downstream side of the purification housing 38 is blocked with the lid body 42. The exhaust gas outlet 41 is opened in an approximately central portion of the lid body 42. An inlet-side lid body 43 is welded and fixed on the end portion on the exhaust upstream side of the purification housing 38. The end portion on the exhaust intake side of the purification housing 38 is blocked with the inlet-side lid body 43.

Next, the structure in which the exhaust gas purification device 2 is assembled with the engine 1 will be described referring to FIGS. 8 to 16. In the engine 1, an inlet-side bracket body 71 and an outlet-side bracket body 72 are provided as housing support bodies for supporting and fixing the exhaust gas purification device 2 (the purification housing 38). The inlet-side bracket body 71 and the outlet-side bracket body 72 are widely formed in the direction intersecting with the output shaft 3 of the engine 1. The inlet-side bracket body 71 and the outlet-side bracket body 72 are detachably coupled directly or through the intake manifold 6 or the exhaust manifold 7, to the cylinder head 5 of the engine 1. The inlet-side bracket body 71 and the outlet-side bracket body 72 are allocated to the front surface side and the rear surface side intersecting with the output shaft 3 in the cylinder head 5 and vertically arranged. The inlet-side bracket body 71 is positioned on the rear surface side of the cylinder head 5 and supports the exhaust intake side of the purification housing 38. The outlet-side bracket body 72 is positioned on the front surface side of the cylinder head 5 and supports the exhaust discharge side of the purification housing 38.

As illustrated in FIGS. 9, 10, 12 and 14 to 16, the inlet-side bracket body 71 is positioned on the rear surface side (above the flywheel housing 10) of the cylinder head 5. The inlet-side bracket body 71 of the embodiment is configured to be separated into an inlet-side first bracket 81 and an inlet-side second bracket 82. The lower end side of the inlet-side first bracket 81 is fastened with bolts to the rear surface of the cylinder head 5. A joint bracket 83 is fastened with bolts to the upper end side of the inlet-side first bracket 81. The base end side of an extension bracket 84 is fastened with bolts to the midway portion of the joint bracket 83, and the tip end side of the extension bracket 84 is fastened to the inlet-side lid body 43 of the purification housing 38 via nuts and bolts. The lower end side of the inlet-side second bracket 82 is fastened to the exhaust manifold 7 via nuts and bolts. The exhaust discharge side of the exhaust joint pipe 85 formed on the upper portion side of the inlet-side second bracket 82 is fastened to the outlet portion of the exhaust manifold 7.

As illustrated in FIGS. 8 to 13 and 15, the outlet-side bracket body 72 is positioned on the front surface side (the side of the cooling fan 9) of the cylinder head 5. The outlet-side bracket body 72 of the embodiment is configured to be separated into an outlet-side first bracket 91 and an outlet-side second bracket 92. The outlet-side first bracket 91 is an approximately L-shaped member that includes a longitudinal cylindrical portion 93 and a lateral frame portion 94 extended sideways from the upper portion side of the cylindrical portion 93. The lower end side of the cylindrical portion 93 is fastened with bolts to the upper surface side of the intake manifold 6. The tip end side of the lateral frame portion 94 is fastened with bolts to the lateral side of the upper portion of the outlet-side second bracket 92. The lower end side of the outlet-side second bracket 92 is fastened with bolts to the front portion on the left lateral surface of the cylinder head 5. The upper end side of the outlet-side second bracket 92 is fastened with bolts to a bracket fastening portion 54a formed on the lower portion side of an outlet clamping flange 54 in the purification housing 38. Accordingly, the outlet-side bracket body 72 assumes an approximately portal shape on the front surface side of the cylinder head 5.

As is obvious in the aforementioned description, the exhaust gas purification device 2 (the purification housing 38) of the embodiment is detachably coupled with the cylinder head 5, the intake manifold 6, and the exhaust manifold 7 of the engine 1 via the inlet-side bracket body 71 and the outlet-side bracket body 72, which are the housing support bodies, above the engine 1. Also, the inlet-side bracket body 71 (the inlet-side first bracket 81 and the inlet-side second bracket 82) disposed on the upstream side (the exhaust intake side) of the transfer direction of the exhaust gas is allocated to the cylinder head 5 and the exhaust manifold 7, and the outlet-side bracket body 72 (the outlet-side first bracket 91 and the outlet-side second bracket 92) disposed on the downstream side (the exhaust discharge side) of the transfer direction of the exhaust gas is allocated to the cylinder head 5 and the intake manifold 6, thereby supporting the exhaust gas purification device 2 (the purification housing 38) at four points.

Figure 11:
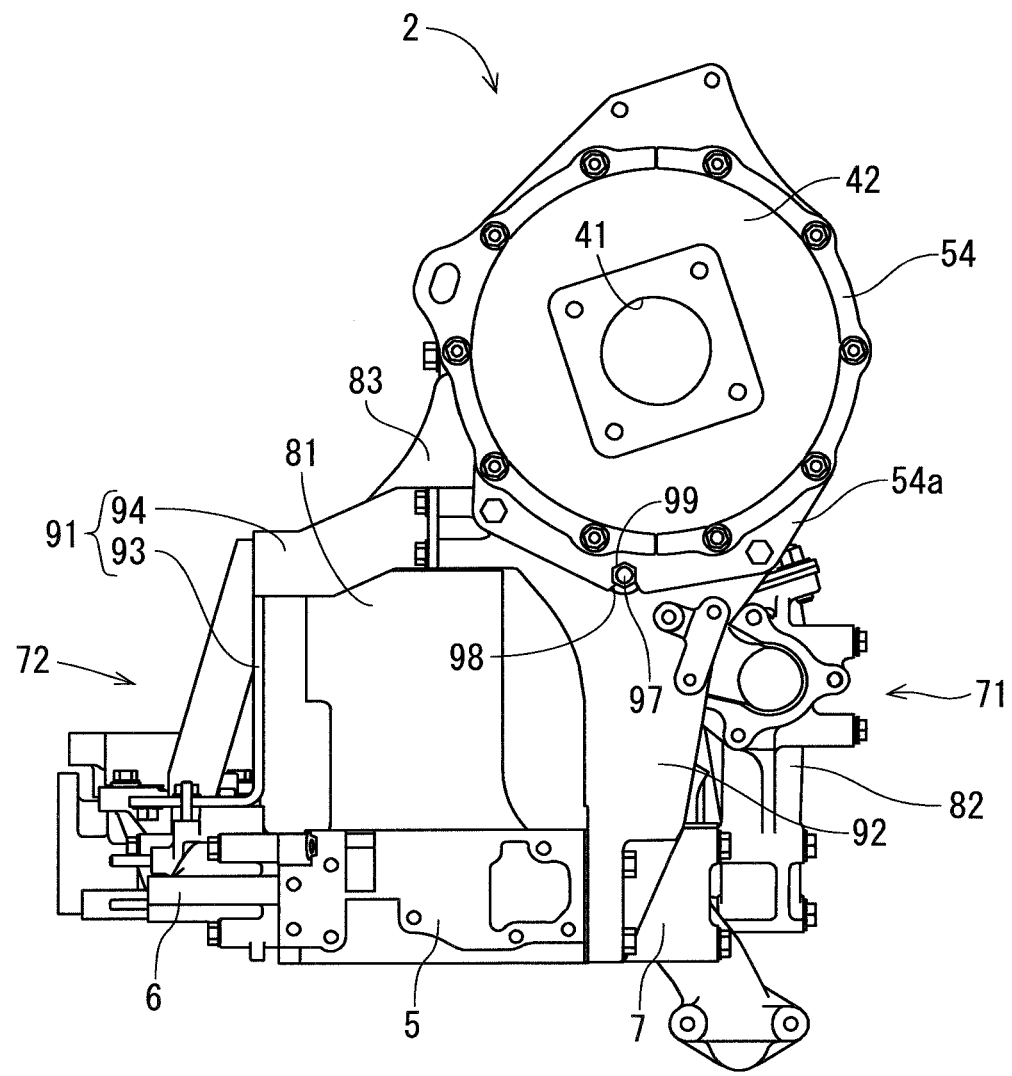
FIG. 11 is a front view illustrating a mounting state of a bracket body and the exhaust gas purification device with respect to the cylinder head.
Figure 12:
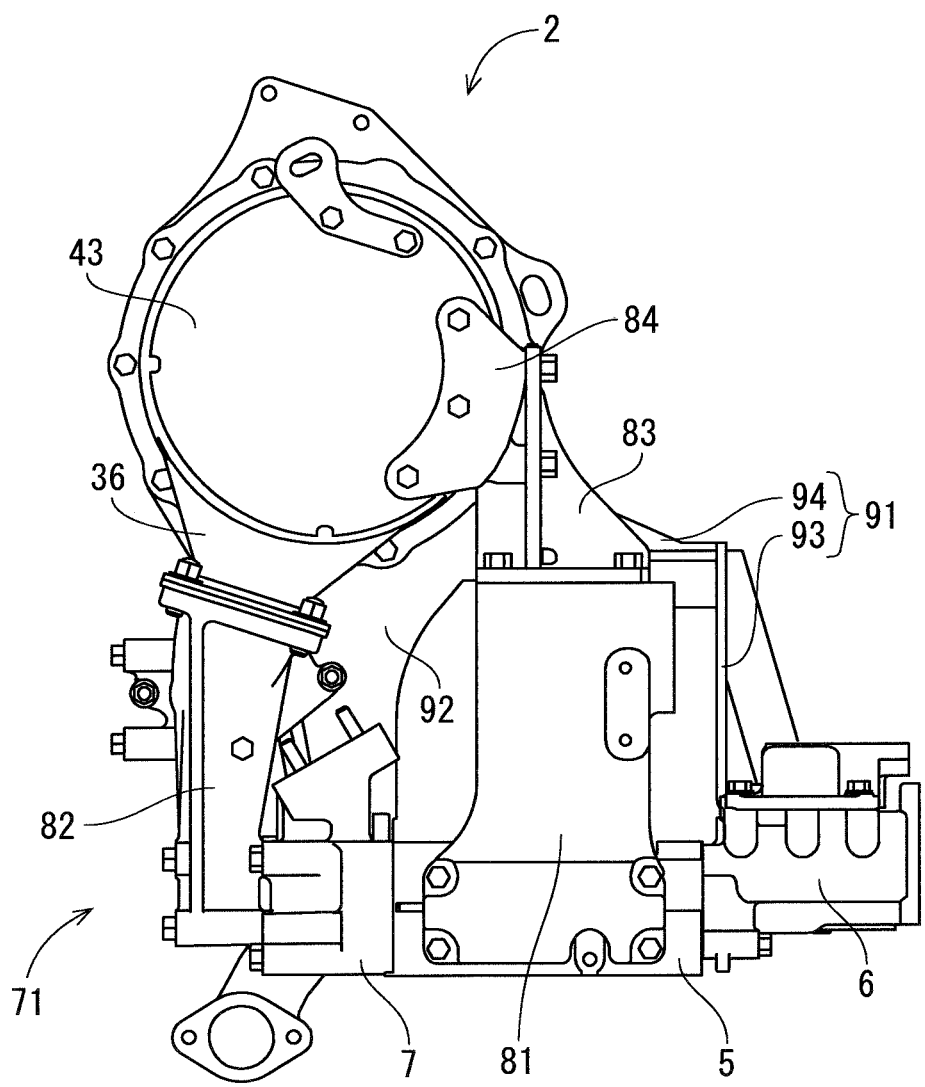
FIG. 12 is a rear view illustrating a mounting state of the bracket body and the exhaust gas purification device with respect to the cylinder head.
Figure 13:
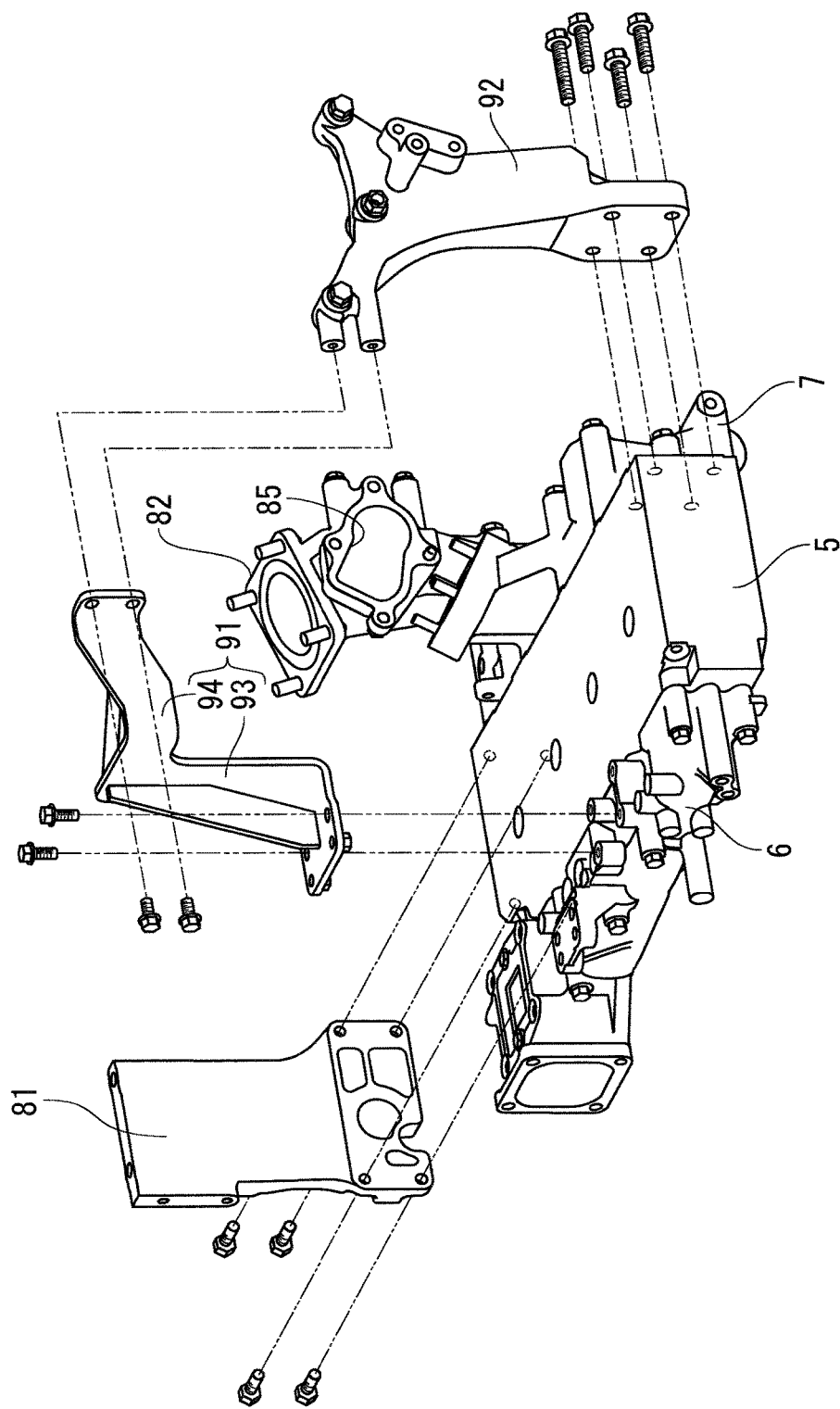
FIG. 13 is a separation perspective view of an inlet-side bracket body and an outlet-side bracket body.
Figure 14:
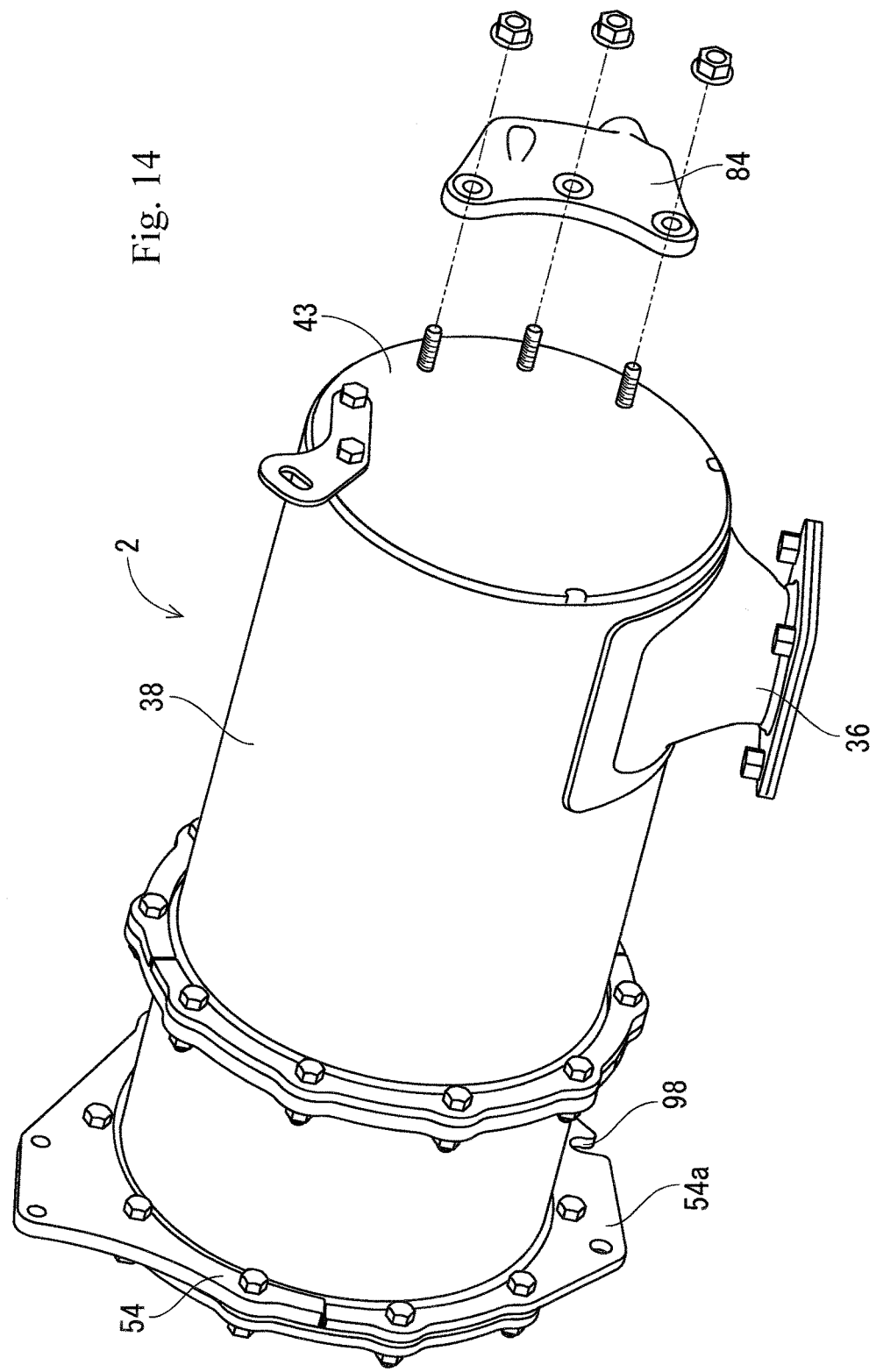
FIG. 14 is a separation perspective view of an extension bracket.
Figure 15:
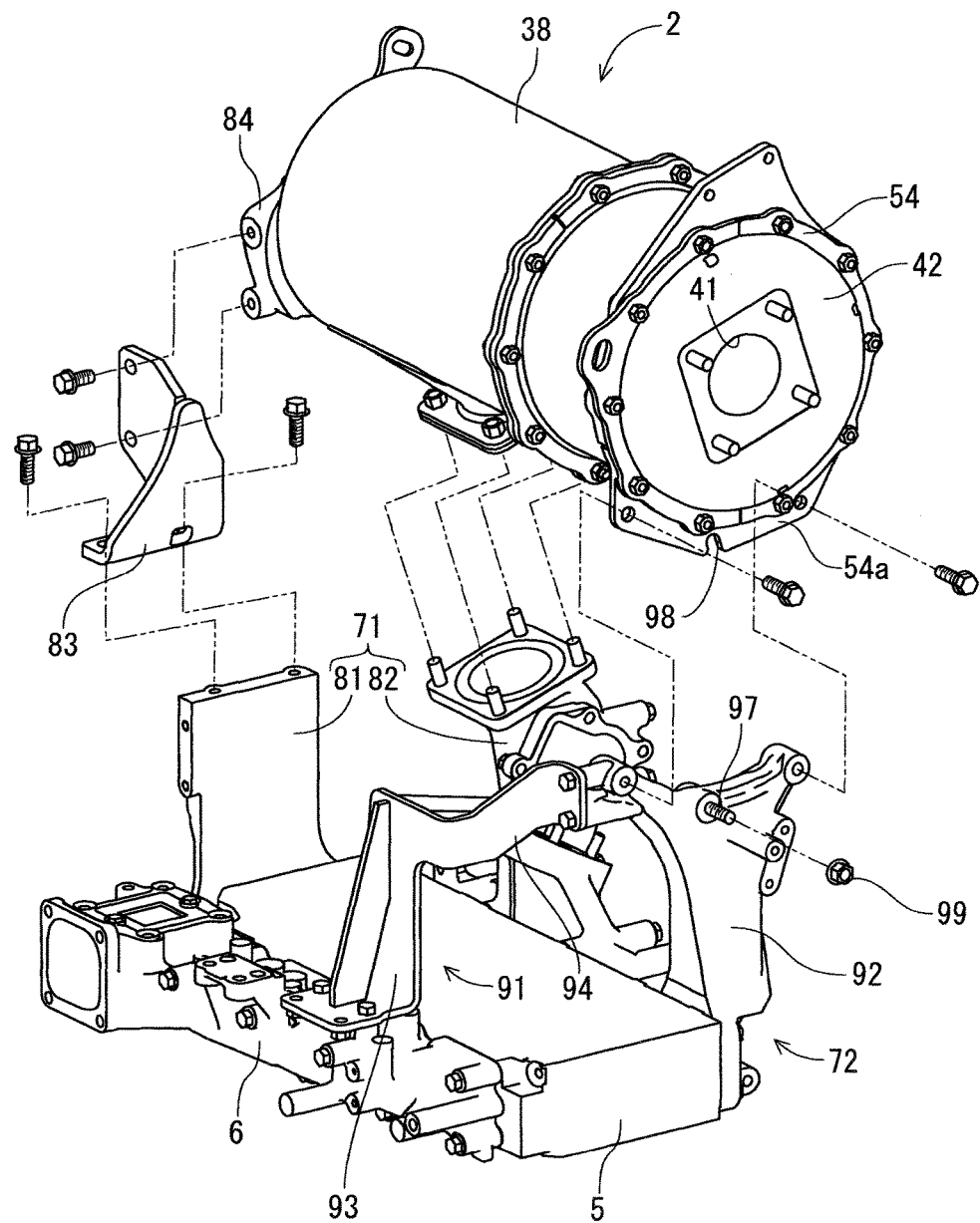
FIG. 15 is a separation perspective view illustrating a mounting mode of the exhaust gas purification device, which is viewed from above on an obliquely right-front side.
Figure 16:
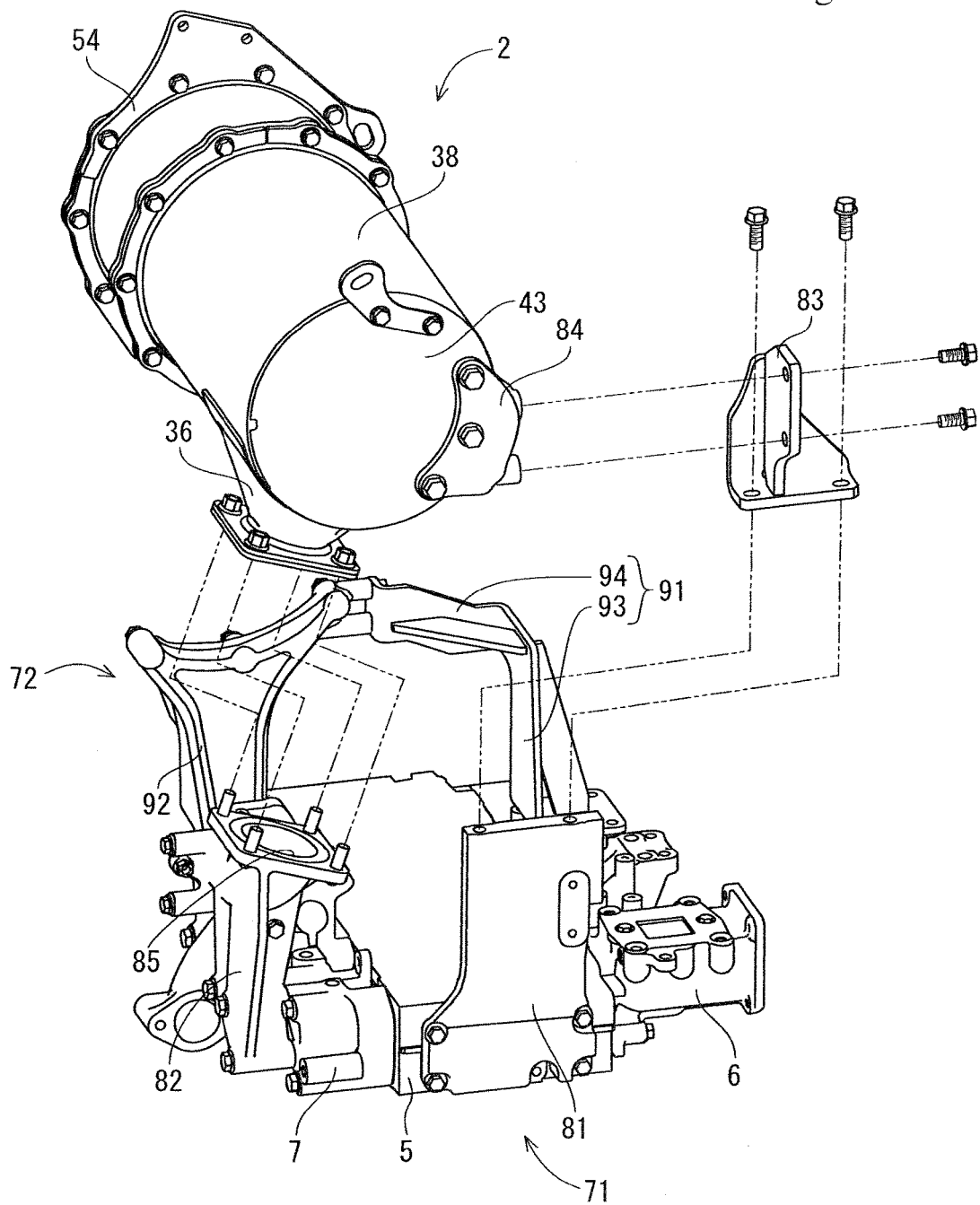
FIG. 16 is a separation perspective view illustrating the mounting mode of the exhaust gas purification device viewed from above on an obliquely right-rear side.
Figure 17:
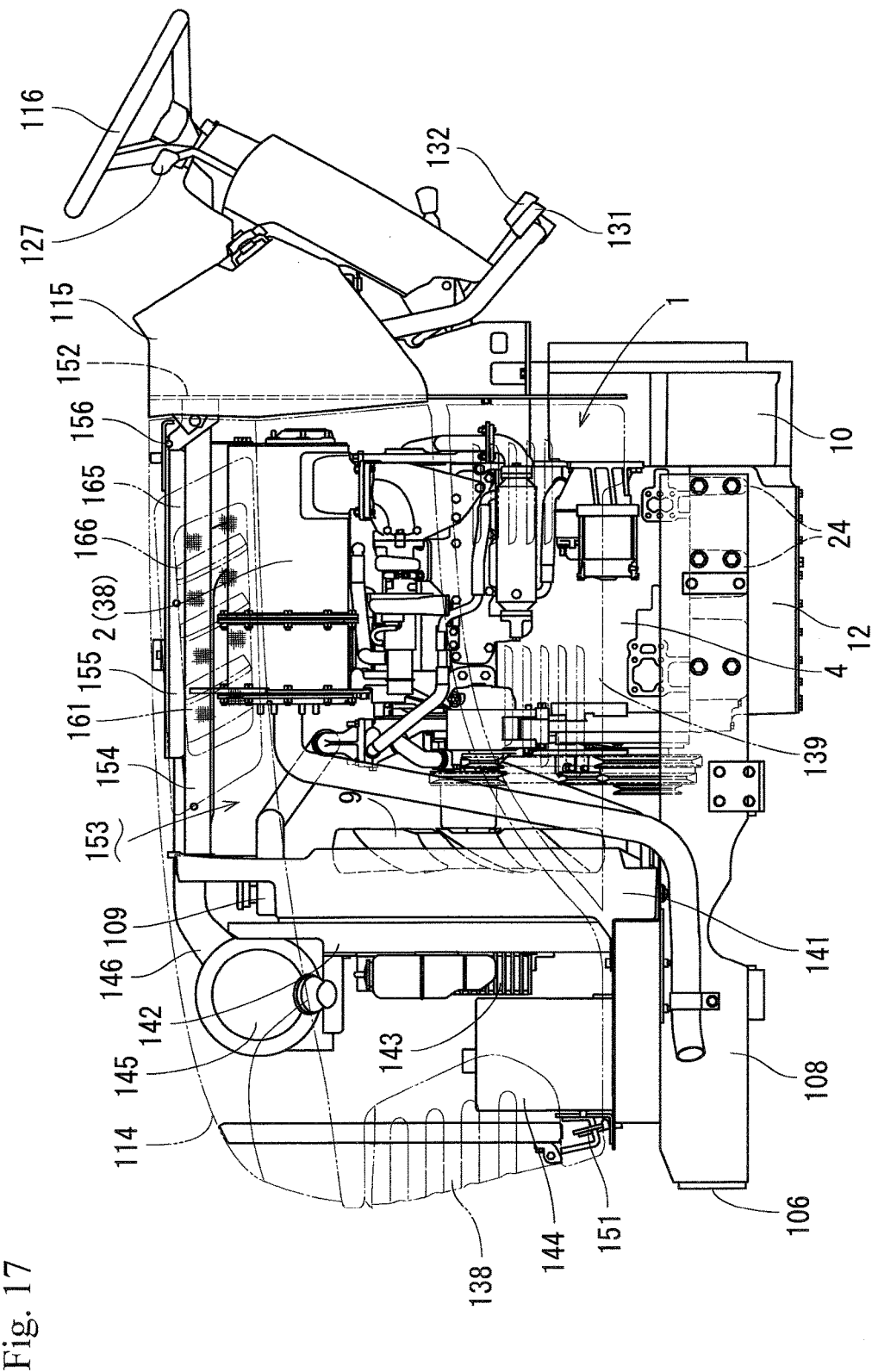
FIG. 17 is a left side view to describe the internal structure of a hood.
Figure 18:
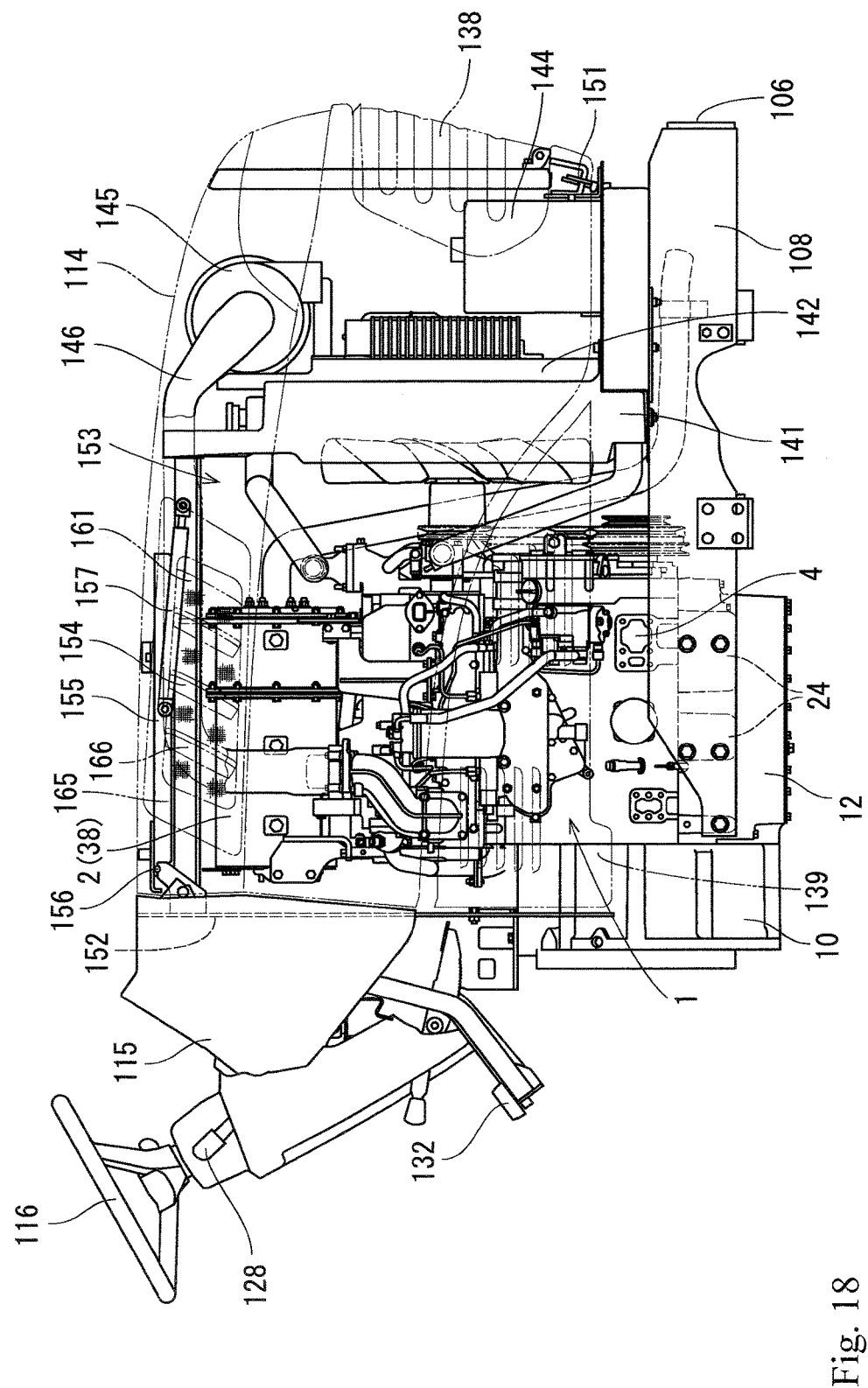
FIG. 18 is a right side view to describe the internal structure of the hood.
Figure 19:
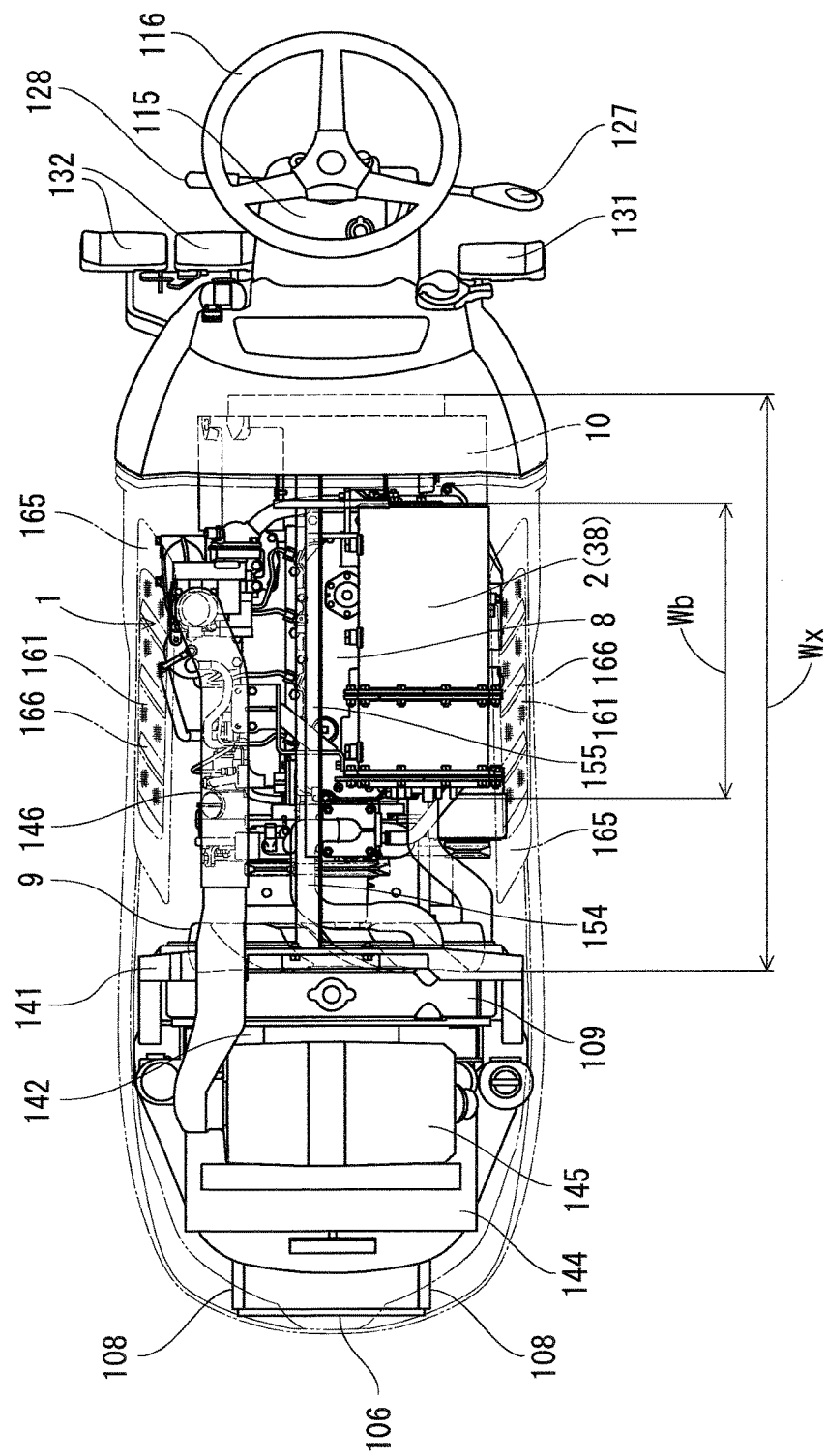
FIG. 19 is a plan view to describe the internal structure of the hood.

As illustrated in FIGS. 11 and 15, an embedded bolt 97 as a locking shaft body is provided on the central portion on the upper end side of the outlet-side second bracket 92. The embedded bolt 97 protrudes forward from the front surface of the central portion on the upper end side of the outlet-side second bracket 92. A temporary fixing notch 98 that is opened downward is formed in the bracket fastening portion 54a of the outlet clamping flange 54 of the purification housing 38. That is, a bolt hole for inserting the embedded bolt 97 formed in the bracket fastening portion 54a of the outlet clamping flange 54 is cut out upward in an open manner, so as to form the temporary fixing notch 98. The embedded bolt 97 of the outlet-side second bracket 92 is lockably constituted in the temporary fixing notch 98 of the bracket fastening portion 54a of the outlet clamping flange 54. The downstream side (the exhaust discharge side) of the transfer direction of the exhaust gas in the purification housing 38 is placed on the upper end side of the outlet-side second bracket 92, and the temporary fixing notch 98 is engaged with the embedded bolt 97, which causes the outlet-side second bracket 92 to support the downstream side (the exhaust discharge side) of the transfer direction of the exhaust gas in the purification housing 38.

The exhaust discharge side of the purification housing 38 is retained at a predetermined position by means of the engagement of the embedded bolt 97 with the temporary fixing notch 98. That is, the joint bracket 83 mounted on the purification housing 38 via the extension bracket 84 is placed on the upper end side of the inlet-side first bracket 81, and the exhaust intake side of the purification inlet pipe 36 is placed on the upper end side (the exhaust discharge side of the exhaust joint pipe 85) of the inlet-side second bracket 82, and the temporary fixing notch 98 on the side of the purification housing 38 is engaged with the embedded bolt 97 on the side of the outlet-side second bracket 92, thereby temporarily fixing the purification housing 38 on the inlet-side bracket body 71 and the outlet-side bracket body 72. Accordingly, the installation position of the exhaust as purification device 2 with respect to the engine 1 can be simply determined, and an operator who performs an assembly work can detach both hands from the exhaust gas purification device 2 in a state of being temporarily fixed. Accordingly, it becomes unnecessary to carry out assembly works and disassembly works such as the fastening with bolts while supporting the entire weight of the exhaust gas purification device 2, so that much labor can be reduced during the loading and unloading works of the exhaust gas purification device 2 or during the assembly and disassembly works of the exhaust gas purification device 2.

Subsequently, the embedded bolt 97 is screwed into (additionally tightened) a locking nut 99 in a state where the temporary fixing notch 98 is engaged with the embedded bolt 97, and the bracket fastening portion 54a of the outlet clamping flange 54 in the purification housing 38 is coupled with the central portion on the upper end side of the outlet-side second bracket 92. It is noted that, contrary to the embodiment, the embedded bolt 97 may be provided on the side of the purification housing 38, and the temporary fixing notch 98 may be provided on the side of the outlet-side second bracket 92. The opening direction of the temporary fixing notch 98 only needs to be set in accordance with the positional relation to the embedded bolt 97, but not limited to the shape opened downward.

As is obvious in the aforementioned description and FIGS. 8 to 16, the engine device includes the exhaust gas purification device 2 that purifies the exhaust gas of the engine 1, in which the exhaust gas purification device 2 is mounted on the engine 1, and the plurality of housing support bodies 71 (81, 82) and 72 (91, 92) coupled with the purification housing 38 constituting the exhaust gas purification device 2 are provided, and the purification housing 38 is coupled with the cylinder head 5, the intake manifold 6, and the exhaust manifold 7 of the engine 1 via the group of the housing support bodies 71 (81, 82) and 72 (91, 92) above the engine 1, so that the exhaust gas purification device 2 can be supported with high rigidity as one constituent component of the engine 1, by use of the cylinder head 5, the intake manifold 6, and the exhaust manifold 7, which are the high-rigidity components of the engine 1, and the damage of the exhaust gas purification device 2 due to vibration and the like can be prevented. The exhaust gas purification device 2 is connected to the exhaust manifold 7 at point-blank range, high-temperature exhaust gas can be introduced to the exhaust gas purification device 2 at all times, and the exhaust gas purification capacity is easily maintained in a favorable state.

In particular, in the embodiment, the lower end sides of the inlet-side first bracket 81 and the outlet-side second bracket 92 are fastened to the cylinder head 5, so that the attachment reference position of the exhaust gas purification device 2 with respect to the engine 1 can be set with high accuracy. Accordingly, even when the weight of the exhaust gas purification device 2 is heavy, the exhaust gas purification device 2 can be appropriately mounted at a predetermined position, compared with a muffler which is an after-treatment device.

As is obvious in the aforementioned description and FIGS. 8 to 16, the purification housing 38 is arranged above the engine 1 in such a manner that the transfer direction of the exhaust gas in the purification housing 38 and the direction of the output shaft 3 of the engine 1 are in parallel to each other, and the two housing support bodies 81 and 82 on the upstream side of the transfer direction of the exhaust gas, out of the group of the housing support bodies 71 (81, 82) and 72 (91, 92), are allocated to the cylinder head 5 and the exhaust manifold 7, and the two housing support bodies 91 and 92 on the downstream side of the transfer direction of the exhaust gas, out of the group of the housing support bodies 71 (81, 82) and 72 (91, 92), are allocated to the cylinder head 5 and the intake manifold 6, thereby supporting the purification housing 38 at the four points, so that the exhaust gas purification device 2 can be mounted on the engine 1 with high rigidity via the group of the housing support bodies 71 (81, 82) and 72 (91, 92), and the effect of preventing the exhaust gas purification device 2 from vibrating can be improved.

As is obvious in the aforementioned description and FIGS. 8 to 16, the exhaust joint path 85 is formed in the housing support body 82 coupled with the exhaust manifold 7, and the exhaust manifold 7 and the exhaust gas purification device 2 are communicated through the exhaust joint path 85, so that the housing support body 83 can be formed with the high rigidity while the exhaust gas purification device 2 can be simply connected to the exhaust manifold 7 at a short distance via the exhaust joint path 85 of the housing support body 82.

Next, the mounting structure of a hood 114 will be described referring to FIGS. 17 to 21. A front grille 138 is formed on the lower side of the front portion of the hood 114. The front, upper, right, and left sections of the engine 1 are covered with right and left engine covers 139 supported by the engine frame 108 and with the hood 114. The radiator 109 mounted on the rear surface side of a fan shroud 141 is vertically arranged on the frontal portion side of the engine frame 108 in such a manner as to be positioned on the frontal surface side of the engine 1. The fan shroud 141 surrounds the outer circumferential side of the cooling fan 9, through which the radiator 109 communicates with the cooling fan 9.

A framed frame 142 having a rectangular frame shape is vertically arranged on the front surface side of the radiator 109. An oil cooler 143 for cooling the hydraulic oil in the transmission case 111 and a battery 144 for supply of power are arranged in the front of the framed frame 142. After cooling air blows against the oil cooler 143 and the radiator 109 by the rotation of the cooling fan 9, the cooling air flows to the engine 1 by way of the fan shroud 141.

An air cleaner 145 for purifying the fresh air introduced to the engine 1 is arranged above the oil cooler 143 and the battery 144 in the front of the framed frame 142. An intake joint pipe 146 extended from one lateral surface of the air cleaner 145 is coupled with the inlet portion of the intake manifold 6 via the EGR device 26. A fresh air introduction pipe 147 for introducing the fresh air to the air cleaner 145 is formed on the outer circumferential surface of the air cleaner 145.

A hood locking mechanism 151 for locking the lower side (the lower end side of the front grille 138) of the front portion of the hood 114 in a lockable manner is provided on the front end side (specifically, below the front grille 138) of the engine frame 108. It is configured such that the hood 114 is retained with the hood locking mechanism 151 in a posture of covering the frontal and upper spaces of the engine 1. A shielding plate 152 for creating a partition between the side of the engine 1 and the side of the maneuvering column 115 is provided on the front surface side of the maneuvering column 115. The right and left engine covers 139, the hood 114, and the shielding plate 152 constitute an engine room 153 that surrounds the front, rear, right, left, and upper sections of the engine 1.

A back-and-forth longitudinal upper support frame 154 is bridged between the upper portion on the rear surface of the fan shroud 141 and the upper portion on the front surface of the shielding plate 152. In contrast, a back-and-forth longitudinal hood stay 155 is provided at a section opposite to the upper support frame 154 on the inner surface side of the hood 114. The rear end side of the hood stay 155 is vertically rotatably mounted on the shielding plate 152 via a hood opening/closing fulcrum shaft 156. A gas damper 157 is mounted between the upper support frame 154 and the hood stay 155. The end portion on the side of the rod of the gas damper 157 is pivotally fitted to the front portion side of the upper support frame in a rotatable manner by means of a pin shaft disposed sideways in the right-and-left direction. The end portion on the side of the cylinder of the gas damper 157 is pivotally fitted to a back-and-forth midway portion of the hood stay 155 in a rotatable manner by means of the pin shaft disposed sideways in the right-and-left direction. After the operation of releasing the locking of the hood locking mechanism 151 is performed, the front portion of the hood 114 is raised forward, thereby rotating the hood 114 upward about the hood opening/closing fulcrum shaft 156 and opening the frontal and upper spaces of the engine 1. Then, the hood 114 is maintained at an open position by the prop-up action of the gas damper 157.

As illustrated in FIGS. 17 to 20, the engine 1 of the embodiment is longitudinally mounted on the front side of the travelling machine body 102 in a state where the cooling fan 9 is positioned on the front side, and the flywheel housing 10 is positioned on the rear side. That is, the engine 1 is mounted on the front side of the travelling machine body 102 in such a manner that the direction of the output shaft 3 is along the advancing direction of the travelling machine body 102. The longitudinal direction (the transfer direction of the exhaust gas in the purification housing 38) of the exhaust gas purification device 2 is parallel to the output shaft 3, so that the exhaust gas purification device 2 (the purification housing 38) arranged near to the exhaust manifold 7 above the engine 1 in a longitudinally mounted posture extended along the advancing direction (the back-and-forth direction) of the travelling machine body 102.

Figure 20:
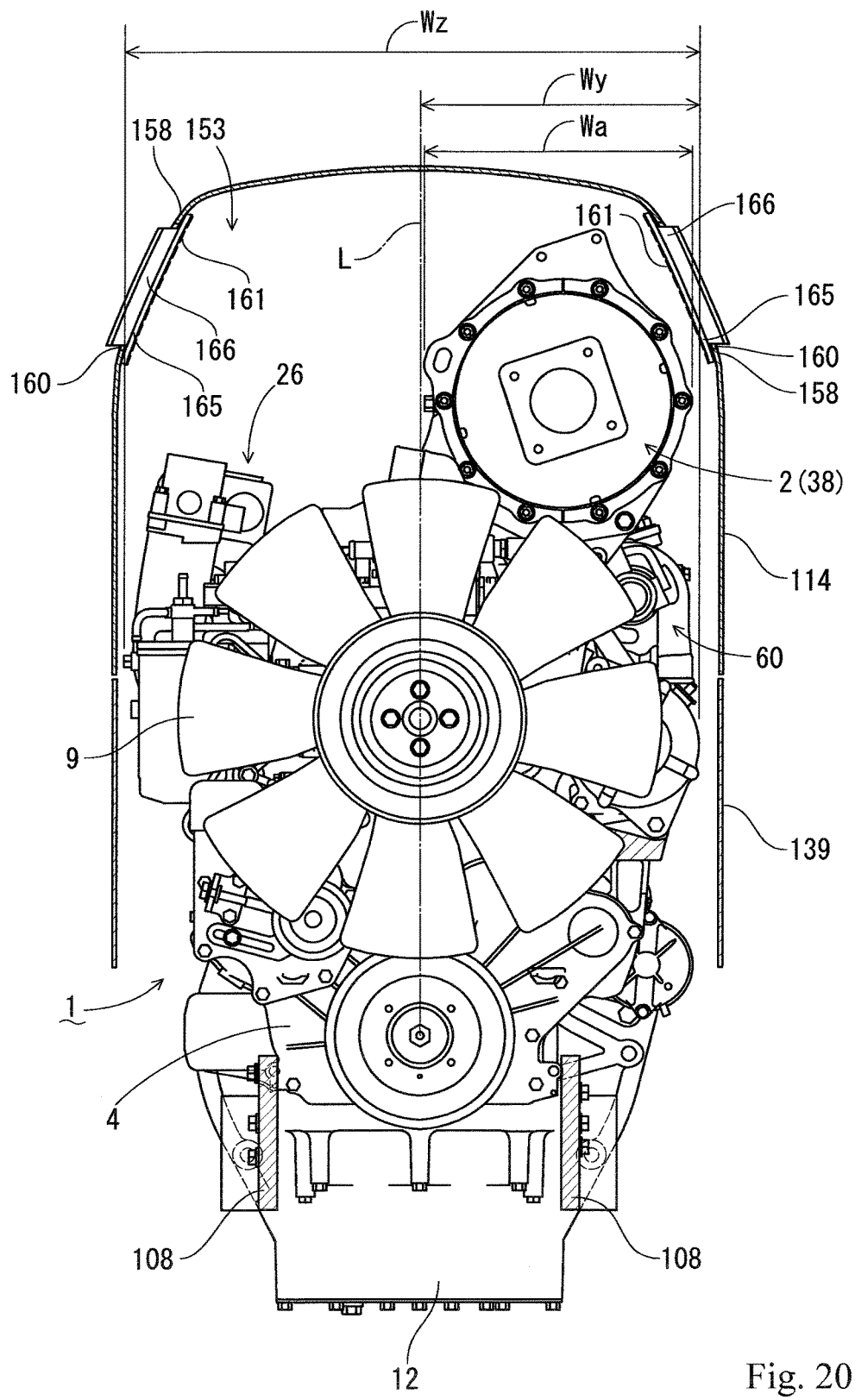
FIG. 20 is a cross-sectional front view illustrating a positional relation of the hood, the engine, and the exhaust gas purification device.
Figure 21:
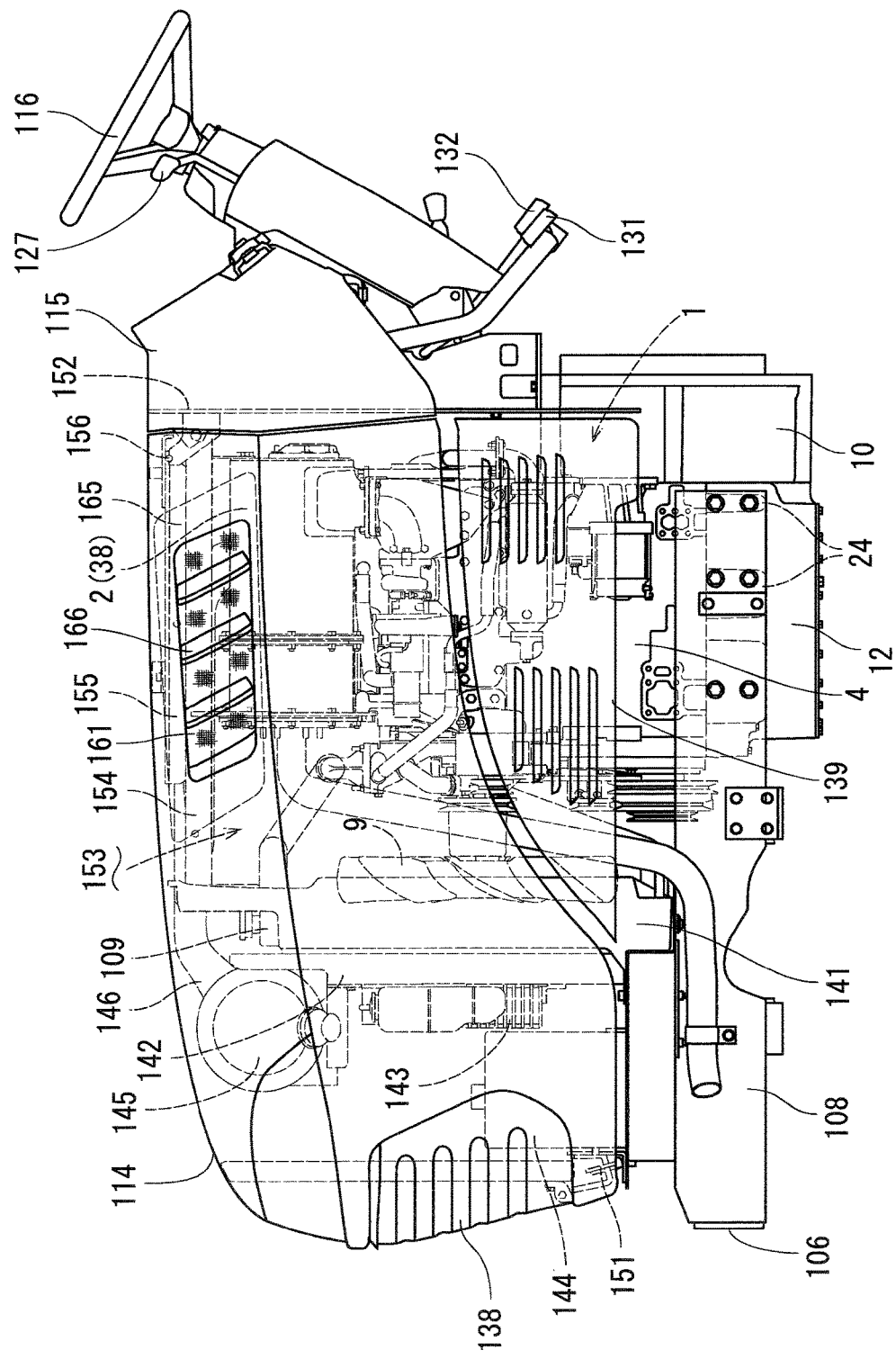
FIG. 21 is a left side view to describe the structure of the external appearance of the hood.

As illustrated in FIG. 20, the hood 114 of the tractor 101 is formed in such a manner that its cross section is an inverted U-shape. The right and left corner portions of the hood 114 are provided as beveling portions 158 that are beveled in such a manner as to tilt obliquely downward on the outer sides of the right and left thereof when viewed from the front surface. The right and left corner portions of the hood 114 are constituted as the beveling portions 158, thereby favorably securing the front view of an operator who sits on the maneuvering seat 117, in particular, a view ahead of the right and left beveling portions 158 of the hood 114. Then, the exhaust gas purification device 2 faces the inner surface side of the left beveling portion 158 of the hood 114.

The exhaust gas purification device 2 is offset near to the center (see a perpendicular virtual line L orthogonal to the output shaft 3 of the engine 1) of the right-and-left width Wz of the engine 1, in order to prevent the exhaust gas purification device 2 from protruding from the engine 1 in the right-and-left direction. The exhaust gas purification device 2 stays within the right-and-left width Wz in the right-and-left direction orthogonal to the output shaft 3 of the engine 1. In the embodiment, the right-and-left width Wa of the exhaust gas purification device 2 is made smaller than a distance Wy from the center of the right-and-left width Wz of the engine 1 to the outermost portion of the right-and-left width Wz. That is, the right-and-left width Wa of the exhaust gas purification device 2 is made smaller than the distance Wy (which corresponds to an approximately half of the right-and-left width Wz of the engine 1) from the perpendicular virtual line L to the outermost portion of the alternator 23. Also, the exhaust gas purification device 2 stays within a back-and-forth width Wx in the back-and-forth direction along the output shaft 3 of the engine 1 when viewed from a plane. That is, a back-and-forth width Wb of the exhaust gas purification device 2 is made smaller than the back-and-forth width Wx (a distance from the cooling fan 9 to the flywheel housing 10) of the engine 1.

As is obvious in the aforementioned description and FIGS. 1, 2 and 17 to 21, the engine device mounted on the tractor 101 that includes the engine 1 that is mounted on the travelling machine body 102 and covered with the hood 114 is such that when the exhaust gas purification device 2 for purifying the exhaust gas of the engine 1 is arranged on one of the right-and-left sides near to the exhaust manifold 7 above the engine 1, the transfer direction of the exhaust gas in the exhaust gas purification device 2 is set in parallel to the direction of the output shaft 3 of the engine 1, and the exhaust gas purification device 2 is offset near to the center of the right-and-left width Wz of the engine 1, in order to prevent the exhaust gas purification device 2 from protruding from the engine 1, and the right-and-left width Wa of the exhaust gas purification device 3 is made smaller than the distance Wy from the center of the right-and-left width Wz of the engine 1 to the outermost portion of the right-and-left width Wz, so that the upper space of the engine 1 is efficiently used, without providing the outward projecting portions of the right-and-left corner portions of the hood found in conventional technologies, and the exhaust gas purification device 2 can be stored in a limited space between the upper portion of the engine 1 and the inner surface of the hood 114. Also, the outward projecting portions of the hood 114, which blocks the view of the operator, can be eliminated, thereby contributing to the improvement of the forward visibility of the tractor 101. Furthermore, the exhaust gas purification device 2, which is a heavy object, is brought close to the center of gravity of the engine 1 and supported, so that an increase in the vibration or noise of the engine 1, which is attributed to the installation of the exhaust gas purification device 2, can be suppressed.

As is obvious in the aforementioned description and FIGS. 1, 2 and 17 to 19, the back-and-forth width Wb of the exhaust gas purification device 2 stays within the back-and-forth width Wx of the engine 1 viewed from a plane, so that even when the engine 1 is assembled with the exhaust gas purification device 2, the structure in which the entire widths of the back, front, right, and left are reduced as much as possible can be provided, which is contributed to the miniaturization as the whole of the engine device. The influence on the shape of the hood 114 due to the assembly of the exhaust gas purification device 2 on the engine 1 can be alleviated, and the complication of the shape of the hood 114 can be avoided.

As illustrated in FIG. 20 in detail, opening holes 160 are formed on the right-and-left bilateral sides of the hood 114. The exhaust as purification device 2 faces the one of the right and left opening holes 160. In the embodiment, each opening hole 160 is formed on the beveling, portion 158 that is tilted obliquely downward from the right-and-left inner side to the right-and-left outer side, out of the right-and-left bilateral surfaces of the hood 114. Each opening hole is made smaller than the shape of the exhaust gas purification device 2 viewed from a lateral surface, and it is configured in such a manner that the exhaust gas purification device 2 does not protrude from the left opening hole 160 facing the exhaust gas purification device 2.

A plurality of introduction fins 166 that are tilted in a posture for taking in outside air from the front side of the travelling machine body 102 in the advancing direction are arranged at a section of each opening hole 160 on the inner surface side of the hood 114. In this case, the plurality of introduction fins 166 are provided side by side at appropriate intervals back and forth in a tilted posture on the front side in the advancing direction while advancing from the right-and-left inner side to the right-and-left outer side, on the inner circumferential side of a mounting frame body 165 formed in a rectangular frame shape in such a manner as to surround the outer circumferential side of the opening hole 160. Then, the mounting frame body 165 is screwed with a plurality of screws on the inner portion side of the hood 114 in such a manner as to insert each introduction fin 166 into the opening hole 160. A ventilating cover 161 made of perforated metal, wire gauze, and the like, which blocks the entry of scattering objects, is mounted on the inner surface side of the mounting frame body 165. The entry of the scattering objects such as dust is hampered with the ventilating cover 161. Also, the operator can be prevented from being in direct contact with the high-temperature exhaust gas purification device 2 by virtue of the existence of the plurality of introduction fins 166 and the ventilating cover 161.

As is obvious in the aforementioned description and FIGS. 15, 16, 20, and 21, the industrial vehicle 101 includes the engine 1 mounted on the front portion of the travelling machine body 102 and the exhaust gas purification device 2 for purifying the exhaust gas of the engine 1, in which the exhaust gas purification device 2 is mounted on the upper portion side of the engine 1, and the engine 1 and the exhaust gas purification device 2 are covered with hood 114, and the maneuvering seat 117 is arranged on the rear side of the hood 114, and the opening holes 160 are formed on the right-and-left bilateral sides of the hood 114, and the introduction fin 166 that is tilted in a posture fir taking in the outside air from the advancing direction is arranged in each opening hole 160, so that heat generated by the exhaust gas purification device 2 can be dissipated to the outside of the hood 114 by way of each opening hole 160 not only during the drive of the engine 1 but also after the stop of the engine 1, and the heat can be prevented from stagnating in the interior of the hood 114. As a result, the occurrence of heat damage on the exhaust gas purification device 2 itself and the hood 114 can be suppressed.

In particular, the introduction fin 166 arranged in each opening hole 160 is tilted in a posture for taking in the air from the front side of the travelling machine body 102 in the advancing direction, so that when the industrial vehicle 101 travels, the outside air is guided and introduced into the hood 114 by means of the introduction fin 166, and the ambient temperature of the exhaust gas purification device 2 can be prevented from increasing excessively. Also, after the stop of the engine 1, the discharge direction of the heat in the interior of the hood 114 is directed forward with respect to the maneuvering seat 117 by means of the introduction fin 166, thereby reducing the possibility of exposing the operator, who takes the maneuvering seat 117, to the heat.

As is obvious in the aforementioned description and FIG. 20, the transfer direction of the exhaust gas in the exhaust gas purification device 2 and the direction of the output shaft 3 of the engine 1 are set in parallel, and the transfer direction of the exhaust gas in the exhaust gas purification device 2 is along the back-and-forth direction of the hood 114, and the exhaust gas purification device 2 is arranged on one of the right and left sides near to the exhaust manifold 7 above the engine 1, so that when the exhaust gas purification device 2 faces one of the opening holes 160, the transfer direction of the exhaust gas in the exhaust gas purification device 2, that is, the longitudinal direction of the exhaust gas purification device 2 along the back-and-forth direction of the hood 114, and the wide range of the outer circumferential surface of the exhaust gas purification device 2 can face one of the opening holes 160. Accordingly, the heat generated by the exhaust gas purification device 2 can be smoothly dissipated to the outside of the hood 114 by way of one of the opening holes 160.

As is obvious in the aforementioned description and FIG. 20, each opening hole 160 is formed on the beveling portion 158 that tilts obliquely downward while advancing from the right-and-left inner side to the right-and-left outer side, out of the right-and-left bilateral surfaces of the hood 114, and it is configured in such a manner that the exhaust gas purification device 2 does not protrude from one of the opening holes 160, so that while the heat generated by the exhaust gas purification device 2 is dissipated to the outside of the hood 114 after the stop of the engine 1, the scattering objects, for example, rainwater and dust can be prevented from falling on the exhaust gas purification device 2.

It is noted that the constitution of each portion of the present invention of the instant application is not limited to the embodiments illustrated, but various modifications can be applied without departing from the scope of the gist of the present invention of the instant application.

REFERENCE SIGNS LIST

1 Engine
2 Exhaust gas purification device
3 Output shaft
4 Cylinder block
5 Cylinder head
6 Intake manifold
7 Exhaust manifold
8 Head cover
9 Cooling fan
71 Inlet-side bracket body
72 Outlet-side bracket body
81 First lifting metal tool
82 Second lifting metal tool 91 Outlet-side first bracket
92 Outlet-side second bracket
97 Embedded bolt
98 Temporary fixing notch
101 Tractor
102 Travelling machine body
114 Hood
158 Beveling portion
160 Opening hole
161 Ventilating cover
165 Mounting frame body
166 Introduction fin

The invention claimed is:

1. A tractor comprising:
a diesel engine mounted on a front portion of a traveling machine body, a cooling fan arranged at a front of the engine for cooling the engine, and a diesel particulate filter for purifying exhaust gas of the engine, wherein the diesel particulate filter is mounted on an upper portion of the engine, and the engine and the diesel particulate filter are covered with a hood, and an operation seat is arranged on a rear side of the hood, wherein
an exhaust gas movement direction of the diesel particulate filter and an output shaft direction of the engine are parallel,
the diesel particulate filter is connected to a cylinder head of the engine via a plurality of supports above the engine and the diesel particulate filter is thereby supported closer one side of the engine than the other and with a major portion thereof elevated above the engine and a side face of the diesel particulate filter is proximate a side of the hood along the entire length of the diesel particulate filter, and
opening holes are formed through said side of the hood along a longitudinal direction of the diesel particulate filter with said side face of the diesel particulate filter facing or next to the opening holes, the opening holes being at a higher elevation than the cooling fan, and in the opening holes fins are arranged, front to back at intervals in a posture inclined toward a direction of forward travel of the tractor as they go from the inside to the outside of the hood.

2. A tractor comprising:
an engine mounted on a front portion of a traveling machine body and an exhaust gas purification device for purifying exhaust gas of the engine, wherein the exhaust gas purification device is mounted on an upper portion of the engine, and the engine and the exhaust gas purification device are covered with a hood, and an operation seat is arranged on a rear side of the hood, wherein
an exhaust gas movement direction of the exhaust gas purification device and an output shaft direction of the engine are parallel,
the exhaust gas purification device is connected to a cylinder head of the engine via a plurality of housing supports above the engine, and
opening holes are formed on surfaces of the hood along a longitudinal direction of the exhaust gas purification device, and a side face of the exhaust gas purification device is arranged to face or to be next to the opening holes, in the opening holes fins are arranged, front to back at intervals in a posture inclined toward a direction of forward travel of the tractor as they go from the inside to the outside of the hood and the right-to-left width of the exhaust gas purification device is smaller than the distance from the center of the right-to-left width of the engine to the outermost of the right-to-left width.

3. The tractor according to claim 2,
wherein each opening hole is formed on a beveling portion that tilts obliquely downward while advancing from an inner side to an outer side, out of said surfaces of the hood, and
wherein the exhaust gas purification device does not protrude from any of the opening holes.

4. The tractor according to claim 3, wherein the exhaust gas purification device comprises a diesel particulate filter, and an exhaust manifold and the diesel particulate filter are arranged closer to a same side of the engine than the other side of the engine.

5. The tractor according to claim 2, wherein the front-to-rear width of the exhaust gas purification device is contained within the front-to-rear width of the engine in plan view.

* * * * *